United States Patent
Roup

(10) Patent No.: US 11,606,982 B2
(45) Date of Patent: Mar. 21, 2023

(54) EXPANDABLE AND FLEXIBLE GARMENT YOKE AND GARMENT WITH SAME

(71) Applicant: Talon Technologies, Inc., Woodland Hills, CA (US)

(72) Inventor: Herman Sydney Roup, Santa Barbara, CA (US)

(73) Assignee: Talon Technologies, Inc., Woodland Hills, CA (US)

( * ) Notice: Subject to any disclaimer, the term of this patent is extended or adjusted under 35 U.S.C. 154(b) by 0 days.

(21) Appl. No.: 17/501,559

(22) Filed: Oct. 14, 2021

(65) Prior Publication Data

US 2022/0104554 A1 Apr. 7, 2022

Related U.S. Application Data

(63) Continuation of application No. 17/011,979, filed on Sep. 3, 2020, now Pat. No. 11,154,096, which is a
(Continued)

(51) Int. Cl.
*A41B 1/08* (2006.01)
*A41D 31/18* (2019.01)
(Continued)

(52) U.S. Cl.
CPC .................. *A41B 1/08* (2013.01); *A41D 1/02* (2013.01); *A41D 1/04* (2013.01); *A41D 1/22* (2013.01);
(Continued)

(58) Field of Classification Search
CPC ...... A41B 1/08; A41B 2300/22; A41D 13/02; A41D 1/02; A41D 1/04; A41D 1/22;
(Continued)

(56) References Cited

U.S. PATENT DOCUMENTS

| 5,987,721 A | 11/1999 | Morris |
| 6,311,333 B1 | 11/2001 | Batra |

(Continued)

FOREIGN PATENT DOCUMENTS

| JP | 2005307369 A | 11/2005 |
| KR | 101503174 B1 | 3/2015 |

OTHER PUBLICATIONS

WIPO, International Search Report and Written Opinion received in International Application No. PCT/IB2019/051593, dated Jul. 18, 2019, (10p.).

(Continued)

*Primary Examiner* — Arti Singh-Pandey
(74) *Attorney, Agent, or Firm* — Siritzky Law, PLLC

(57) ABSTRACT

A garment has a yoke attached to the garment body, wherein the yoke is formed from a material having stretch and recovery in at least two directions thereof. The material may be formed from a fusible substrate combined with a particular fabric having stretch properties. The yoke may have an inner piece and an outer piece having substantially the same shape and size as the inner piece, and wherein at least one of the inner piece and the outer piece is formed from a material formed from a fusible substrate combined with a particular fabric having stretch properties. The garment body includes a back and a front, and the yoke includes at least one back portion configured with the back of the garment body, and at least one front portion configured with the front of the garment body. The first material has stretch and recovery properties at offset angles with respect to the at least one direction.

20 Claims, 20 Drawing Sheets

Related U.S. Application Data continuation of application No. PCT/IB2019/051593, filed on Feb. 28, 2019.

(60) Provisional application No. 62/641,471, filed on Mar. 12, 2018.

(51) Int. Cl.

| | | |
|---|---|---|
| *A41D 1/02* | (2006.01) | |
| *A41D 1/04* | (2006.01) | |
| *A41D 1/22* | (2018.01) | |
| *A41D 13/02* | (2006.01) | |
| *A41D 27/10* | (2006.01) | |
| *B32B 5/04* | (2006.01) | |
| *B32B 5/24* | (2006.01) | |

(52) U.S. Cl.
CPC ............ *A41D 13/02* (2013.01); *A41D 27/10* (2013.01); *A41D 31/185* (2019.02); *B32B 5/04* (2013.01); *B32B 5/24* (2013.01); *A41B 2300/22* (2013.01); *A41D 2200/20* (2013.01); *A41D 2300/22* (2013.01); *B32B 2307/51* (2013.01); *B32B 2437/00* (2013.01)

(58) Field of Classification Search
CPC .. A41D 2200/20; A41D 27/10; A41D 31/185; B32B 2307/51; B32B 2437/00; B32B 5/04; B32B 5/24
See application file for complete search history.

(56) References Cited

U.S. PATENT DOCUMENTS

| | | |
|---|---|---|
| 6,732,413 B1 | 5/2004 | Morris |
| 7,331,301 B2 | 2/2008 | Morris |
| 7,367,094 B2 | 5/2008 | Morris |
| 7,506,597 B2 | 3/2009 | Morris |
| 8,528,492 B2 | 9/2013 | Morris |
| 8,544,156 B2 | 10/2013 | Morris |
| 9,066,549 B2 | 6/2015 | Morris |
| 9,290,349 B2 | 3/2016 | Morris |
| 9,756,879 B2 | 9/2017 | Roup |
| 9,840,037 B2 | 12/2017 | Roup |
| 9,872,522 B2 | 1/2018 | Roup |
| 9,955,741 B2 | 5/2018 | Roup |
| 9,968,149 B2 | 5/2018 | Morris |
| 10,220,601 B2 | 3/2019 | Roup et al. |
| 10,285,457 B2 | 5/2019 | Roup |
| 10,375,999 B2 | 8/2019 | Roup |
| 10,464,252 B2 | 11/2019 | Roup |
| 10,828,864 B2 | 11/2020 | Roup et al. |
| 11,006,679 B2 | 5/2021 | Roup |
| 11,034,130 B2 | 6/2021 | Roup et al. |
| 2008/0264335 A1 | 10/2008 | Roup |
| 2008/0268157 A1 | 10/2008 | Roup |
| 2010/0294814 A1 | 11/2010 | Geiwald |
| 2015/0113697 A1 | 4/2015 | Roup |
| 2016/0113334 A1 | 4/2016 | Roup |
| 2016/0366949 A1 | 12/2016 | Roup |
| 2017/0027237 A1 | 2/2017 | Yu |
| 2017/0253016 A1 | 9/2017 | Roup et al. |
| 2017/0367412 A1 | 12/2017 | Roup |
| 2018/0049479 A1 | 2/2018 | Patterson |
| 2018/0104887 A1 | 4/2018 | Roup |
| 2018/0140022 A1 | 5/2018 | Roup |
| 2018/0235291 A1 | 8/2018 | Roup |
| 2019/0335824 A1 | 11/2019 | Roup |
| 2019/0387808 A1 | 12/2019 | Roup |
| 2020/0114567 A1 | 4/2020 | Roup |
| 2020/0180263 A1 | 6/2020 | Roup et al. |
| 2021/0052017 A1 | 2/2021 | Roup |
| 2021/0101363 A1 | 4/2021 | Roup et al. |
| 2021/0204616 A1 | 7/2021 | Roup |

OTHER PUBLICATIONS

USPTO, Non-Final Rejection, dated Mar. 16, 2021 in U.S. Appl. No. 17/011,979, 14 pages.

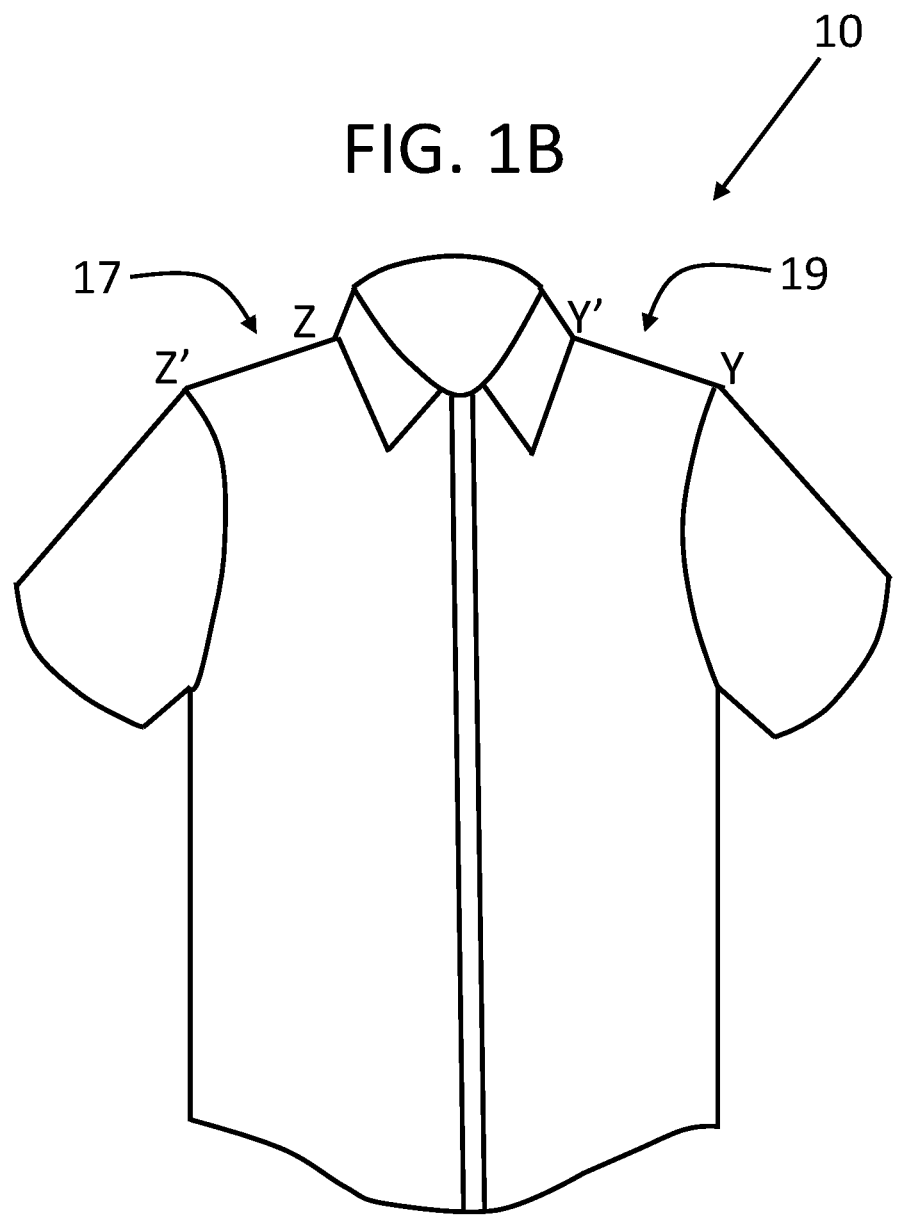

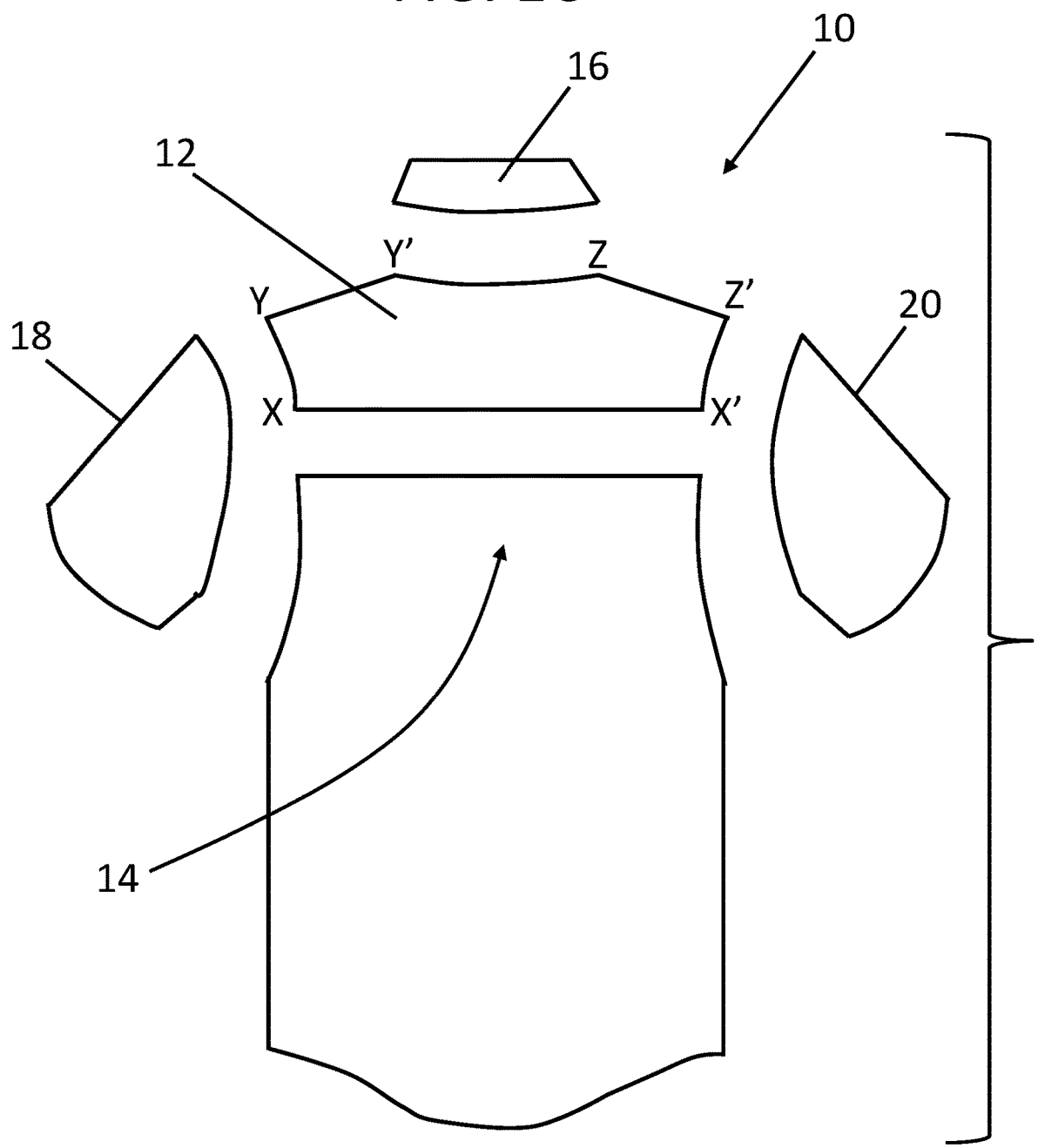

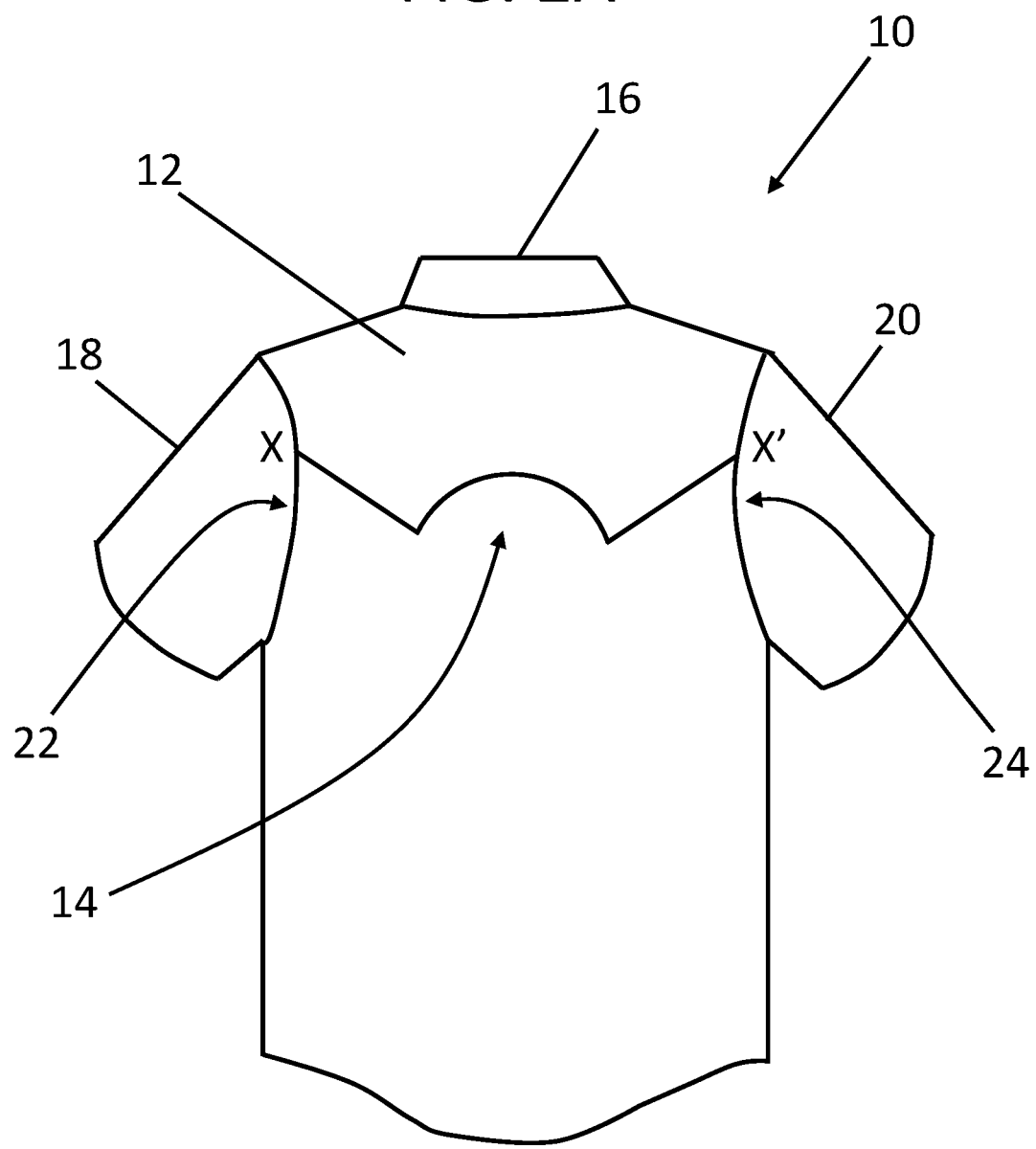

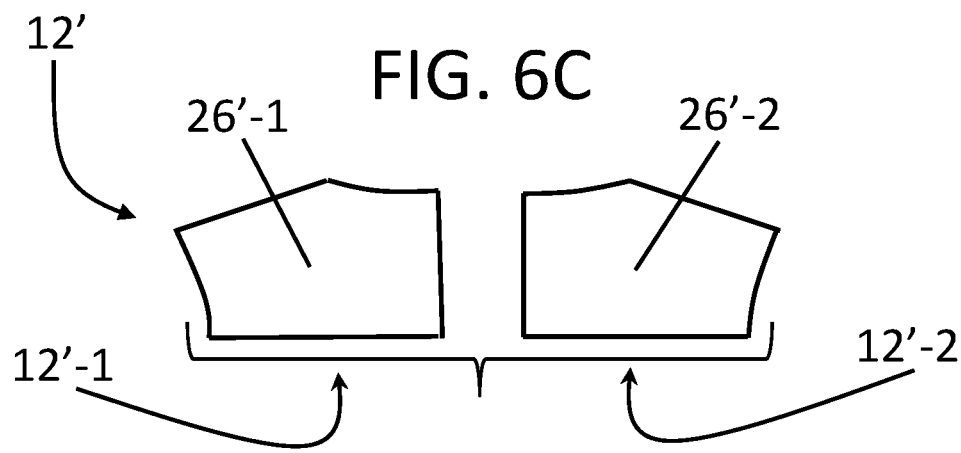
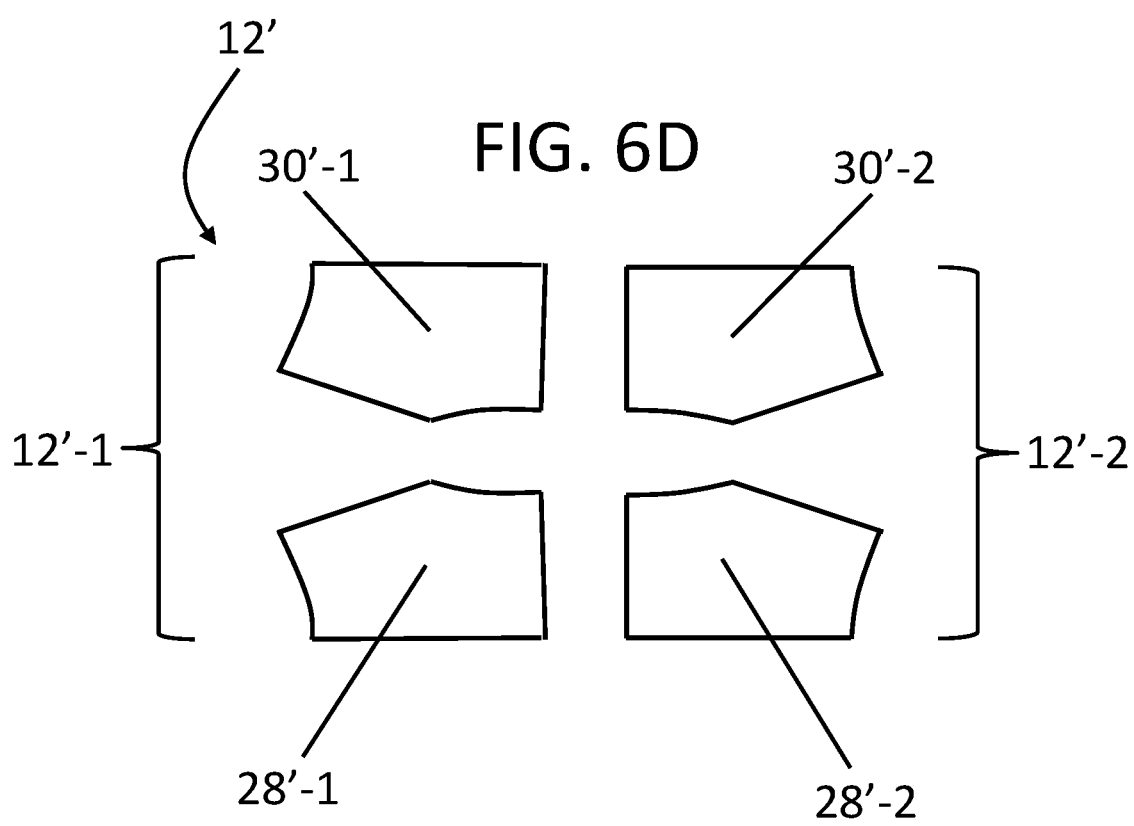

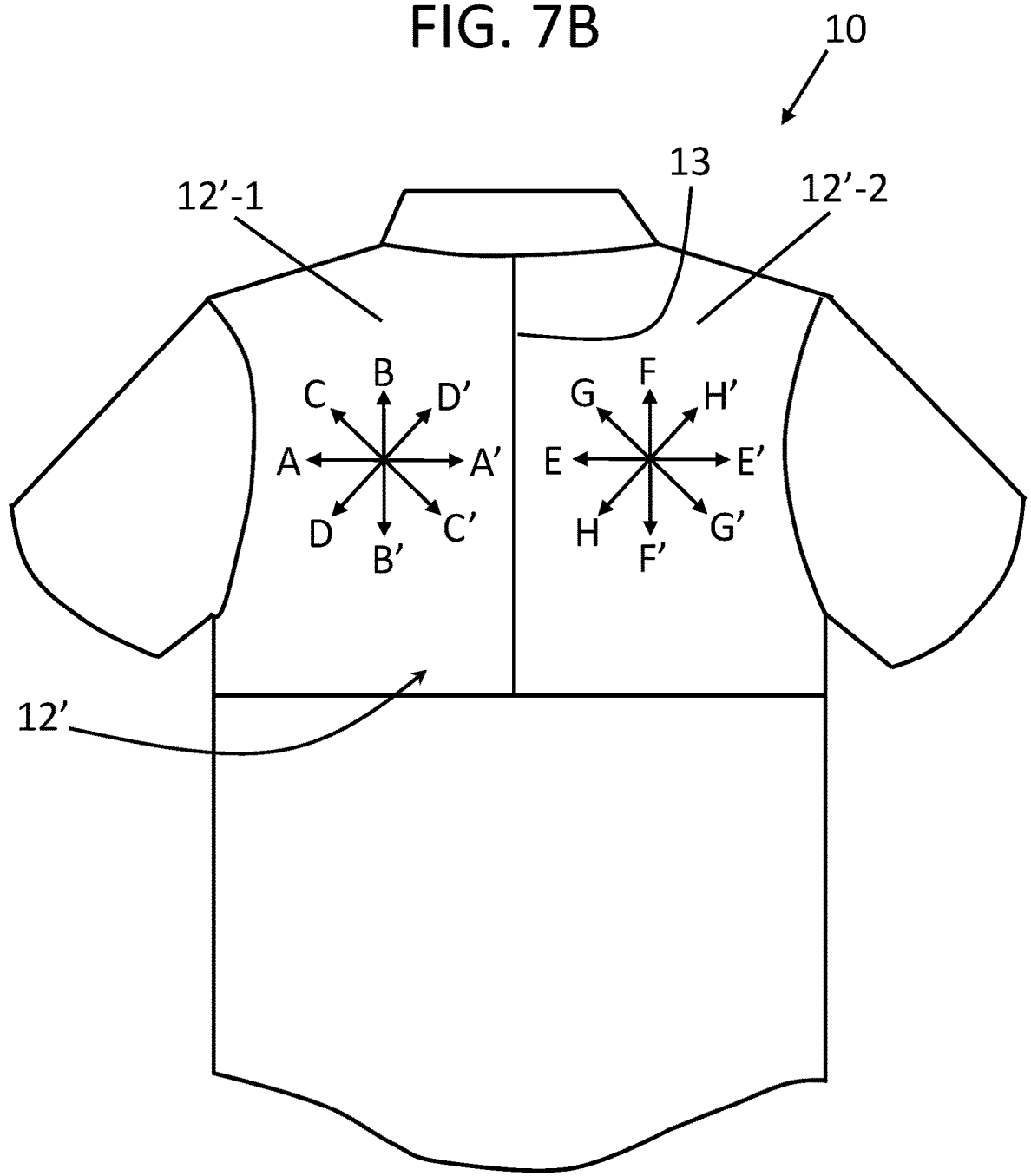

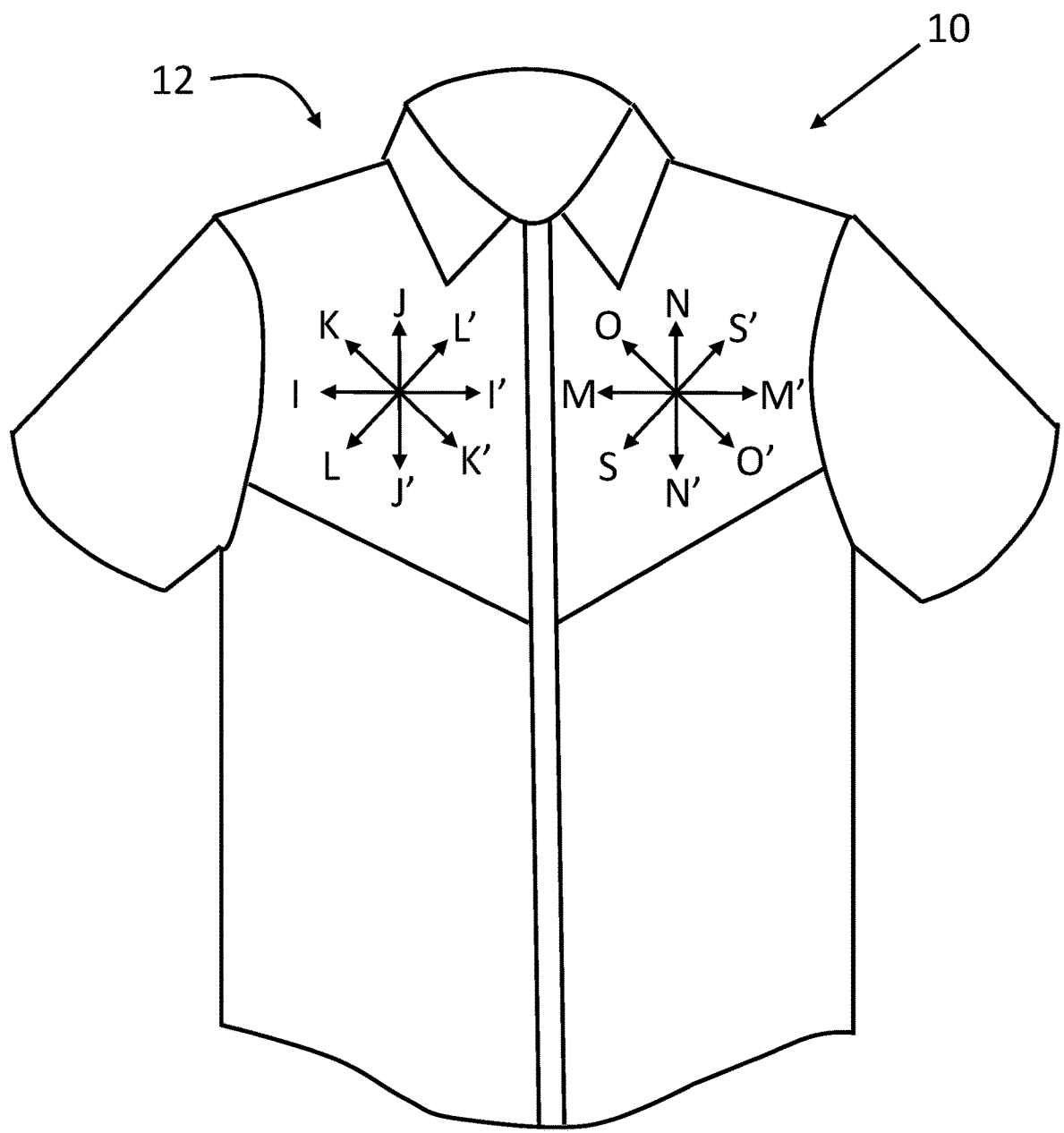

EXPANDABLE AND FLEXIBLE GARMENT YOKE AND GARMENT WITH SAME

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This application is a continuation U.S. patent application Ser. No. 17/011,979, filed Sep. 3, 2020, issued Oct. 26, 2021, as U.S. Pat. No. 11,154,096, and which is a continuation of PCT/IB2019/051593, filed Feb. 28, 2019, published as WO/2019/175697, which claims the benefit of U.S. Provisional patent application No. 62/641,471, filed Mar. 12, 2018, the entire contents of each of which are hereby fully incorporated herein by reference for all purposes.

FIELD OF THE INVENTION

This invention relates garments and garments manufacture. More particularly, this invention relates to shirts and expandable shirt yokes and backs.

BACKGROUND

Shirts, especially men's dress shirts and work shirts, are generally sized to fit a wearer such that any shrinkage in the shirt will adversely affect the wearer. In particular, any shrinkage across the back or yoke of the shirt may affect the wearer.

The fabrics used for most woven, dress and work shirts are subject to shrinkage from laundering, and so most woven, dress and work shirts may become difficult or uncomfortable to wear after multiple washes. In addition, the wearer of a shirt may gain weight, thereby increasing their chest and back size and making their dress and/or work shirts tight across the top of the back.

Even if a shirt does not shrink, and even if a wearer does not gain weight, the wearer's actions (e.g., folding their arms) may cause the shirt, especially the yoke, to tighten and become uncomfortable or even tear.

Shirts, especially men's woven, dress and work shirts, may not flex or expand in accordance with the movements of the wearer's upper body. The shirts may become taught and may bind when the wearer performs physical movements (e.g., reaching forward to pick up a box, golfing, casting while fishing, etc.).

It is desirable to provide a shirt with a yoke that expands across the top of the back, as needed, while keeping its shape, and for it to return to its original length after expansion. It is further desirable to provide a shirt yoke with little or no shrinkage. It is also desirable to provide a shirt yoke that flexes when worn to eliminate puckering where the yoke joins the collar stand and other parts of the shirt. It is further desirable to provide a shirt with a yoke that has expansion and recovery properties. It is further desirable to provide such a shirt and yoke made of the same underlying self-fabric.

It is desirable to provide a shirt yoke that expands, as needed, while keeping its shape, and for it to return to its original width and length. It is further desirable to provide a shirt yoke that flexes when worn to improve comfort of the shirt.

SUMMARY

The present invention is specified in the claims as well as in the description.

Those of ordinary skill in the art will appreciate and understand, upon reading this description, that embodiments hereof provide a garment (e.g., a shirt) with a yoke that expands in any direction or combinations of directions as needed, while keeping its shape, and returns to its original shape and dimensions after expansion.

One general aspect includes a garment including a yoke attached to a garment body. The garment according to this aspect also includes where at least a portion of the yoke is formed from a first material having stretch and recovery in at least one direction thereof, the material being formed from a fusible substrate combined with a particular fabric having stretch properties.

Implementations may include one or more of the following features:
The garment where at least a portion of the yoke extends below an armhole of the garment.
The garment where the particular fabric is single-ply.
The garment where the first material is formed from the particular fabric fused with the fusible substrate.
The garment where the yoke includes an inner piece and an outer piece having substantially the same shape and size as the inner piece, and where at least one of the inner piece and the outer piece is formed from the first material.
The garment where both the inner piece and the outer piece are formed from the first material.
The garment where the garment body includes a back and a front, and the yoke includes at least one back portion configured with the back of the garment body, and at least one front portion configured with the front of the garment body.
The garment where the yoke includes a left section and a right section.
The garment where the first material has stretch and recovery at offset angles with respect to the at least one direction.
The garment where the particular fabric is selected from: a self-fabric, a shirting fabric, cotton, poly-cotton, linen, a compacted woven material, and a compacted knit material.
The garment where the particular fabric is the same fabric as the garment's fabric.
The garment where the fusible substrate is a two-way fusible substrate.
The garment where at least some of the particular fabric used in the yoke is cut on a bias thereof
The garment where the fusible substrate provides memory to the yoke. The garment of any one where the particular fabric has the stretch properties, at least in part, from being compacted, and where the fusible substrate controls the stretch properties of the particular fabric.
The garment where the garment is selected from: a shirt, an overall, a jacket, a hooded garment, and a dress.

One general aspect includes, in combination, a yoke attached to a garment body. The combination also includes where the yoke is formed from a particular fabric, the yoke having stretch and recovery in at least one direction thereof. The combination also includes where the yoke includes an inner piece and an outer piece. The combination also includes where at least one of the inner piece and the outer piece is formed using the particular fabric combined with a second material that provides and controls stretch and recovery in the least one direction.

Implementations may include one or more of the following features:

The combination where the at least one of the inner piece and the outer piece is formed using the particular fabric fused with the second material.

The combination where the particular fabric is selected from: a self-fabric, a shirting fabric, cotton, poly-cotton, linen; a compacted woven material, and a compacted knit material.

The combination where the particular fabric is the same fabric as the garment's fabric.

The combination where at least some of the particular fabric used in the yoke is cut on a bias thereof The combination where the particular fabric has stretch properties, at least in part, from being compacted, and where the second material controls the stretch properties of the particular fabric.

The combination where the second material provides memory to the yoke.

The combination where the second material includes a fusible substrate.

One general aspect includes a garment including the combination yoke and garment body according to any of the combinations.

One general aspect includes a garment including a yoke attached to a garment body. The garment according to this aspect also includes where the yoke includes a left side yoke part and a right side yoke part, the left side yoke having substantially the same shape as the right side yoke part, the left side yoke being connected to the right side yoke part. The garment according to this aspect also includes where at least a portion of the left side yoke part is formed from a first material. The garment according to this aspect also includes where at least a portion of the right side yoke part is formed from the first material. The garment according to this aspect also includes where the first material is formed from a particular fabric combined with a second material, and where. The garment according to this aspect also includes the left side yoke part has stretch and recovery properties in at least one direction thereof, and where the second material including the left side yoke part controls the stretch and recovery properties of the left side yoke part. The garment according to this aspect also includes the right side yoke part has stretch and recovery in at least one direction thereof, and where the second material including the right side yoke part controls the stretch and recovery properties of the right side yoke part.

Implementations may include one or more of the following features:

The garment where (i) the left side yoke part includes a left inner piece and a left outer piece, and where at least one of the left inner piece and the left outer piece is formed using the first material combined with the second material; and (ii) the right side yoke part includes a right inner piece and a right outer piece, and where at least one of the right inner piece and the right outer piece is formed using the first material combined with the second material.

The garment where the first material is a particular fabric.

The garment where the particular fabric is selected from: a shirting fabric, cotton, poly-cotton, linen; a compacted woven material, and a compacted knit material.

The garment where the particular fabric is the same fabric as the garment's fabric.

The garment where at least some of the particular fabric used in the yoke is cut on a bias thereof The garment where the particular fabric has the stretch properties, at least in part, from being compacted, and where the second material controls the stretch properties of the particular fabric.

The garment where the second material provides memory to the yoke.

The garment where the second material includes a fusible substrate.

The garment where the garment is selected from: a shirt, an overall, a jacket, a hooded garment, and a dress.

Below is a list of garment embodiments. Those will be indicated with a letter "G". Whenever such embodiments are referred to, this will be done by referring to "G" embodiments.

G1. A garment comprising a yoke attached to the garment body; wherein at least a portion of the yoke is formed from a first material having stretch and recovery in at least one direction thereof, said first material being formed from a particular fabric combined with a fusible substrate, said particular fabric having stretch properties.

G2. The garment according to the previous embodiment, wherein at least a portion of the yoke extends below an armhole of the garment.

G3. The garment of any of the preceding embodiments, wherein the first material is single-ply.

G4. The garment of any of the preceding embodiments, wherein the first material is formed from the particular fabric fused with the fusible substrate.

G5. The garment of any of the preceding embodiments, wherein the yoke comprises an inner piece and an outer piece having substantially the same shape and size as the inner piece, and wherein at least one of the inner piece and the outer piece is formed from the first material.

G6. The garment according to the previous embodiment, wherein both the inner piece and the outer piece are formed from the first material.

G7. The garment of any of the preceding embodiments, wherein the garment body includes a back and a front, and the yoke includes at least one back portion configured with the back of the garment body, and at least one front portion configured with the front of the garment body.

G8. The garment of any of the preceding embodiments, wherein the yoke includes a left section and a right section.

G9. The garment of any of the preceding embodiments, wherein the first material has stretch and recovery at offset angles with respect to the at least one direction.

G10. The garment of any of the preceding embodiments, wherein the particular fabric is selected from: a garmenting fabric, cotton, poly-cotton, linen; a compacted woven material, a knit material, a mesh, and a compacted knit material.

G11. The garment of any of the preceding embodiments, wherein the particular fabric is the same fabric as the garment's fabric.

G12. The garment of any of the preceding embodiments, wherein at least some of the particular fabric used in the yoke is cut on a bias thereof G13. The garment of any of the preceding embodiments, wherein the first material is single-ply.

G14. The garment of any of the preceding embodiments, wherein the fusible substrate provides memory to the yoke.

G15. The garment of any of the preceding embodiments, wherein said particular fabric has the stretch properties, at least in part, from being compacted, and wherein the fusible substrate controls the stretch properties of the particular fabric.

G16: The garment of any of the preceding embodiments, wherein the garment is selected from: a shirt, an overall, a jacket, a hooded garment, and a dress.

G17: The garment of any of the preceding embodiments, wherein the particular fabric is selected from: a self-fabric, a garmenting fabric, cotton, poly-cotton, linen; a compacted woven material, and/or a compacted knit material. The fabric may comprise a mesh.

Below is a list of garment and yoke combination embodiments. Those will be indicated with a letter "C". Whenever such embodiments are referred to, this will be done by referring to "C" embodiments.

C1. A combination including a yoke attached to a garment body, wherein the yoke is formed from a particular fabric, the yoke having stretch and recovery in at least one direction thereof, and wherein the yoke comprises an inner piece and an outer piece, and wherein at least one of the inner piece and the outer piece is formed using the particular fabric combined with a second material that provides and controls stretch and recovery in the least one direction.

C2. The combination according to the previous embodiment, wherein the at least one of the inner piece and the outer piece is formed using the particular fabric fused with the second material.

C3. The combination of any of the embodiments C1-C2, wherein the particular fabric is selected from: a garmenting fabric, cotton, poly-cotton, linen; a compacted woven material, and a compacted knit material. The particular fabric may comprise a mesh.

C4. The combination of any of the embodiments C1-C3, wherein the particular fabric is the same fabric as the garment's fabric.

C5. The combination of any of the embodiments C1-C4, wherein at least some of the particular fabric used in the yoke is cut on a bias thereof C6. The combination of any of the embodiments C1-05, wherein the particular fabric has the stretch properties, at least in part, from being compacted, and wherein the second material controls the stretch properties of the particular fabric.

C7. The combination of any of the embodiments C1-C6, wherein the second material provides memory to the yoke.

C8. The combination of any of the embodiments C1-C7, wherein the second material comprises a fusible substrate.

C9. The combination of any of the embodiments C1-C8, wherein the garment is selected from: a shirt, an overall, a jacket, a hooded garment, and a dress.

Below is a list of garment (or garment) embodiments. Those will be indicated with a letter "S". Whenever such embodiments are referred to, this will be done by referring to "S" embodiments.

G16. A garment comprising the combination of a yoke attached to a garment body of any one of the embodiments C1-C9.

G17. A garment comprising a yoke attached to the garment body;
wherein the yoke comprises a left side yoke part and a right side yoke part, the left side yoke having substantially the same shape as the right side yoke part, the left side yoke being connected to the right side yoke part,
wherein at least a portion of the left side yoke part is formed from a first material, and
wherein at least a portion of the right side yoke part is formed from said first material,
wherein the first material is formed from a particular fabric combined with a second material, and
wherein the left side yoke part has stretch and recovery properties in at least one direction thereof, and wherein the second material comprising the left side yoke part controls the stretch and recovery properties of the left side yoke part, and
the right side yoke part has stretch and recovery in at least one direction thereof, and wherein the second material comprising the right side yoke part controls the stretch and recovery properties of the right side yoke part.

G18. The garment according to the previous embodiment (G16), wherein (i) the left side yoke part comprises a left inner piece and a left outer piece, and wherein at least one of the left inner piece and the left outer piece is formed using the first material combined with the second material; and (ii) the right side yoke part comprises a right inner piece and a right outer piece, and wherein at least one of the right inner piece and the right outer piece is formed using the first material combined with the second material.

G19. The garment of any of the embodiments G17-G18, wherein the first material is a self-fabric.

G20. The garment of embodiment G19, wherein the self-fabric is selected from: a garmenting fabric, cotton, poly-cotton, linen, a compacted woven material, and a compacted knit material. The particular fabric may comprise a mesh.

G21. The garment of any of the embodiments G17-G20, wherein the self-fabric is the same fabric as the garment's fabric.

G22. The garment according to any of the embodiments G17-G21, wherein at least some of the self-fabric used in the yoke is cut on a bias thereof G23. The garment of any of the embodiments G17-G22, wherein the self-fabric has the stretch properties, at least in part, from being compacted, and wherein the second material controls the stretch properties of the self-fabric.

G24. The garment of any of the embodiments G17-G23, wherein the second material provides memory to the yoke.

G25. The garment of any of the embodiments G17-G24, wherein the second material comprises a fusible substrate.

G26: The garment of any of the embodiments G17-G25 wherein the garment is selected from: a shirt, an overall, a jacket, a hooded garment, and a dress.

The above features along with additional details of the invention, are described further in the examples herein, which are intended to further illustrate the invention but are not intended to limit its scope in any way.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 1A-1B show aspects of a shirt yoke according to exemplary embodiments hereof;

FIG. 1C depicts an exploded view of aspects of the shirt yoke of FIGS. 1A-1B;

FIGS. 2A-2B show aspects of a shirt yoke according to exemplary embodiments hereof;

FIGS. 6A-6D show aspects of shirt yokes according to exemplary embodiments hereof;

FIGS. 7A-7C show aspects of shirt yokes according to exemplary embodiments hereof.

DETAILED DESCRIPTION OF THE PRESENTLY PREFERRED EXEMPLARY EMBODIMENTS

Figure 1A:
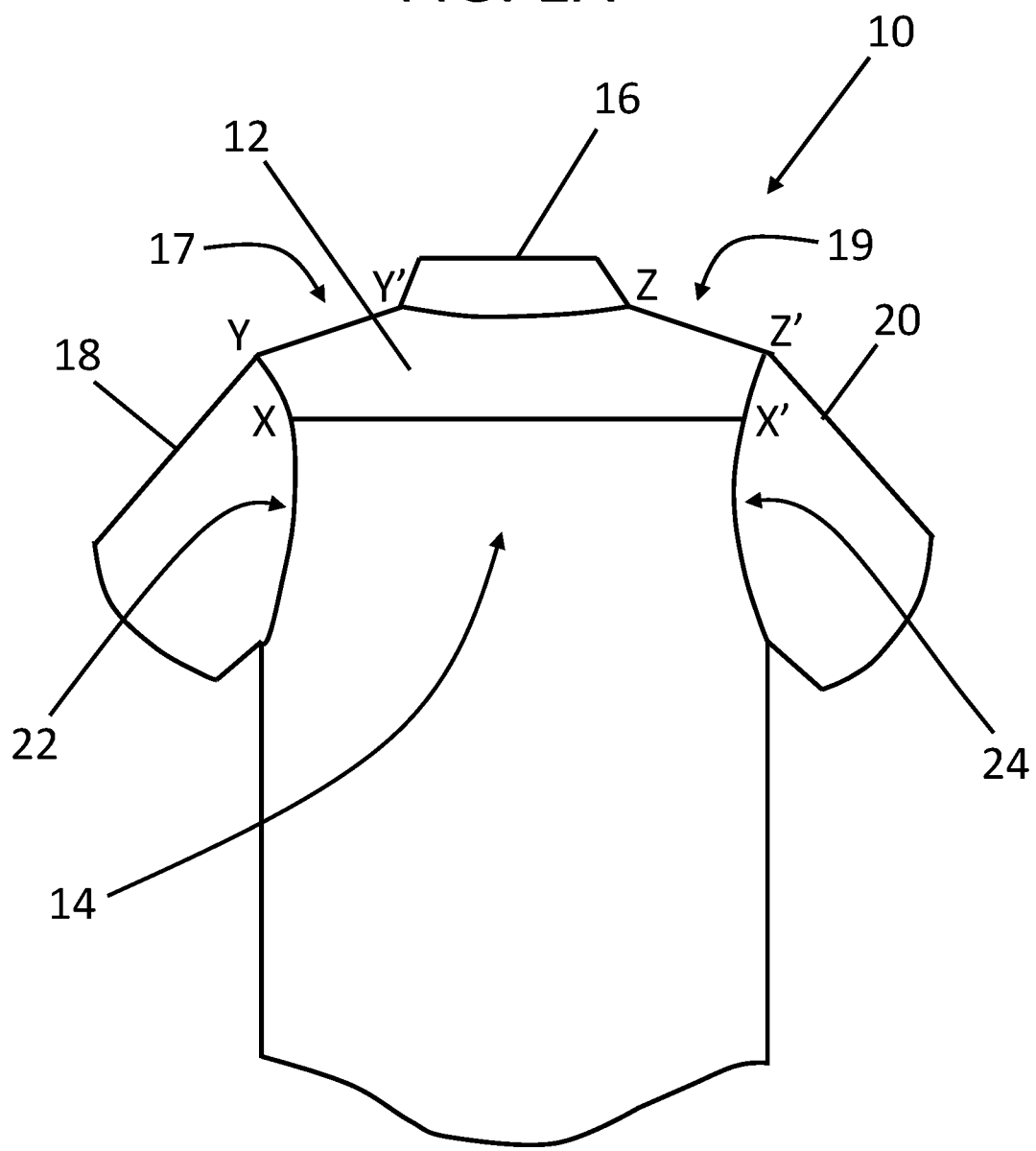

FIG. 1A shows a shirt 10 (viewed from the back) incorporating a yoke 12 according to exemplary embodiments hereof. The yoke 12 may be attached to the shirt back body 14, e.g., by being sewn along the line X-X'. A collar 16 may be attached to the yoke 12, e.g., by being sewn along the line Y'-Z. The collar 16 may or may not include a collar stand (e.g., an expandable and flexible shirt collar stand as described in U.S. Pat. No. 9,756,879, the entire contents of which are hereby fully incorporated herein by reference for all purposes). The collar 16 may be directly incorporated into the yoke 12.

The shirt 10 is made with a self-fabric, which may be any general shirting fabric, including cotton, poly-cotton, linen, etc. The self-fabric may also be rigid material, mechanical stretch material, stretch material (e.g., Lycra or Spandex), or other types of materials (e.g., a compacted woven material, and/or a compacted knit material). The self-fabric may comprise a mesh.

The yoke 12 may be attached to the shirt front body on the left, e.g., by being sewn along the line Y-Y', and on the right, e.g., by being sewn along the line Z-Z'. The yoke 12 may be attached to a left sleeve 18, e.g., by being sewn along the line X-Y, and to a right sleeve 20, e.g., by being sewn along the line X'-Z'. Note that the elements of the shirt 10 may also be attached using attachment methods other than sewing such as fabric welding, adhesives or other attachment methods. In addition, the yoke may be attached with different and/or other attachment methods in different places or parts. For example, the connections along lines X-Y and X'-Z' may differ from the connections along lines X-X' or Y-Y' or Z-Z'. Attachment methods may differ, e.g., in the kind of method (e.g., stitching vs. welding or the like), or in the kind of stitching.

The body of the shirt 10 may also include a left armhole 22 and a right armhole 24 as shown. As is known in the art, the left sleeve 18 may be configured with the left armhole 22, and the right sleeve 20 may be configured with the right armhole 24. Note that the left and right sleeves 18, 20 may be short sleeves (as depicted in FIG. 1A), long sleeves, three-quarter sleeves or any other lengths, types or combinations of lengths or types of sleeves. In addition, the left and right sleeves 18, 20 may not be necessary and the shirt may be sleeveless. It will be appreciated by a person of ordinary skill in the art, upon reading this specification, that the exemplary embodiments described herein are not limited by the type, lengths, dimensions or any other characteristics of the left and right sleeves 18, 20.

FIG. 1B depicts the shirt 10 of FIG. 1A viewed from the front. As can be seen, lines Y-Y' and Z-Z' in this embodiment may be generally located across the tops of the right and left shoulders 17, 19 respectively of the shirt 10, when worn.

For purposes of this description, the length X-X' may be referred to as the across the back width, the length Y-Y' may be referred to as the left shoulder length, and the length Z-Z' may be referred to as the right shoulder length. As should be appreciated, a yoke's length varies along its width, and vice versa.

FIG. 1C depicts an exploded view of the aspects of the shirt 10 including the shirt yoke 12 of FIG. 1A.

The yoke 12 and other pieces may have border regions (not shown) that can be used for connecting (e.g., stitching) to adjacent pieces. In general, in the drawings, the yoke, yoke pieces, and shirt pieces are exemplary in shape and border or stitching regions may not be shown.

As depicted, e.g., in FIG. 2A, the lower portion of the yoke 12 that may generally form the across the back width (X-X') may not necessarily be a straight line as depicted in FIG. 1A, but may also include curvatures, angles or other types of shapes or forms (e.g., the Western style of yoke 12 depicted in FIG. 2A). Other shapes and forms and combinations of different shapes and forms of yokes 12 may also be included and are within the scope of this embodiment.

Figure 2B:
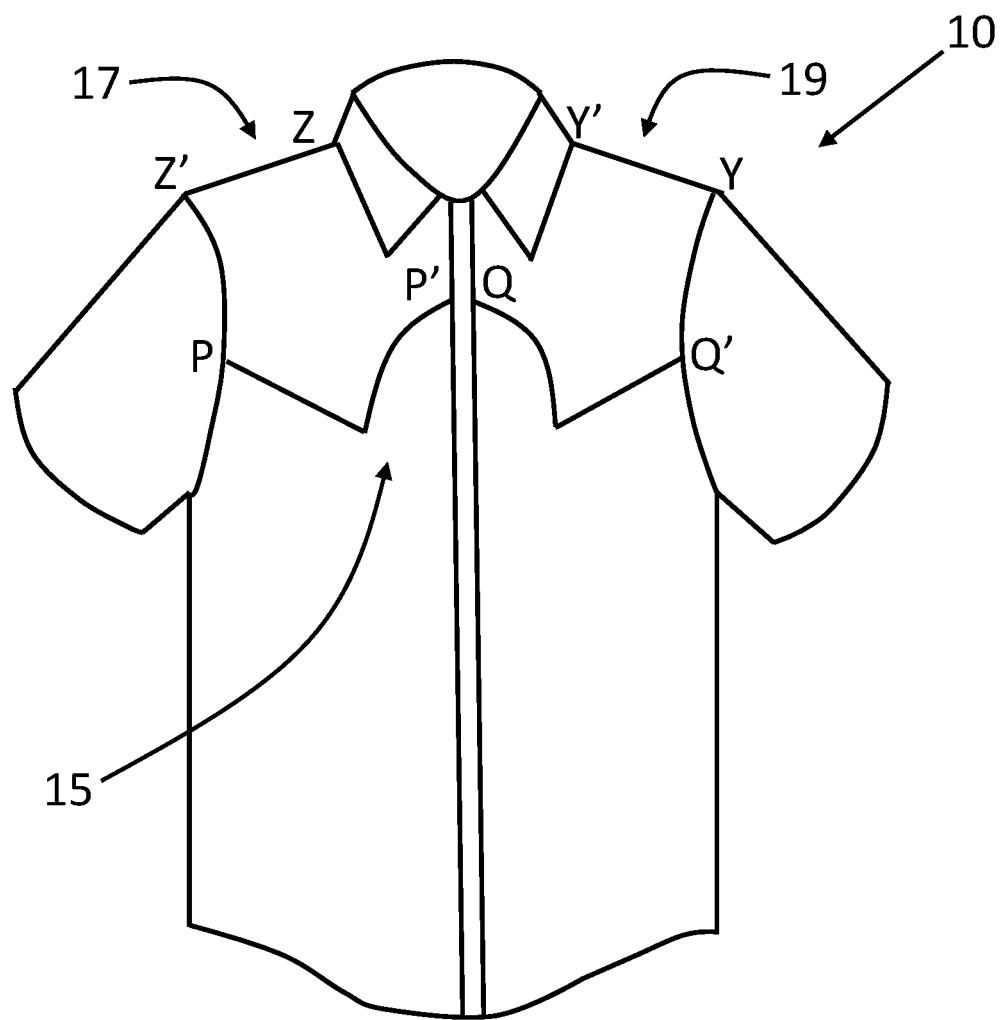

As depicted in FIG. 2B, the yoke 12 may also include a front portion that may generally extend over the left and right shoulders 17, 19 and be configured with the front 15 of the shirt. In this case, the yoke 12 may include a back portion that may generally be configured with the back 14 of the shirt 10 (e.g., the yoke 12 of FIG. 2A) and a front portion that may generally be configured with the front 15 of the shirt 10 (e.g., the yoke 12 of FIG. 2B).

The front and back portions of the yoke 12 may be formed of the same piece of material, or the front portion may include one or more additional pieces that may be attached to the back portion of the yoke 12 (e.g., sewn along the lines Y-Y' and Z-Z'). The front portion of the yoke 12 may be attached to the shirt front body 15 on the left, e.g., by being sewn along the line P-P', and on the right, e.g., by being sewn along the line Q-Q'. If the front and back portions of the yoke 12 are formed of the same piece, then there may or may not be a need for stitching a front portion with a back portion (e.g., no need for stitches along lines Y-Y' and Z-Z'). Also, lines P-P' and Q-Q' may include curvatures, angles or other types of shapes or forms such as the Western style of yoke 12 depicted in FIG. 2B. Other shapes and forms and combinations of shapes and forms of yokes 12 may also be included and are within the scope of this embodiment. In one example, FIG. 2B may depict the front of the shirt 10 of FIG. 2A (Western style yoke 12).

Figure 3:
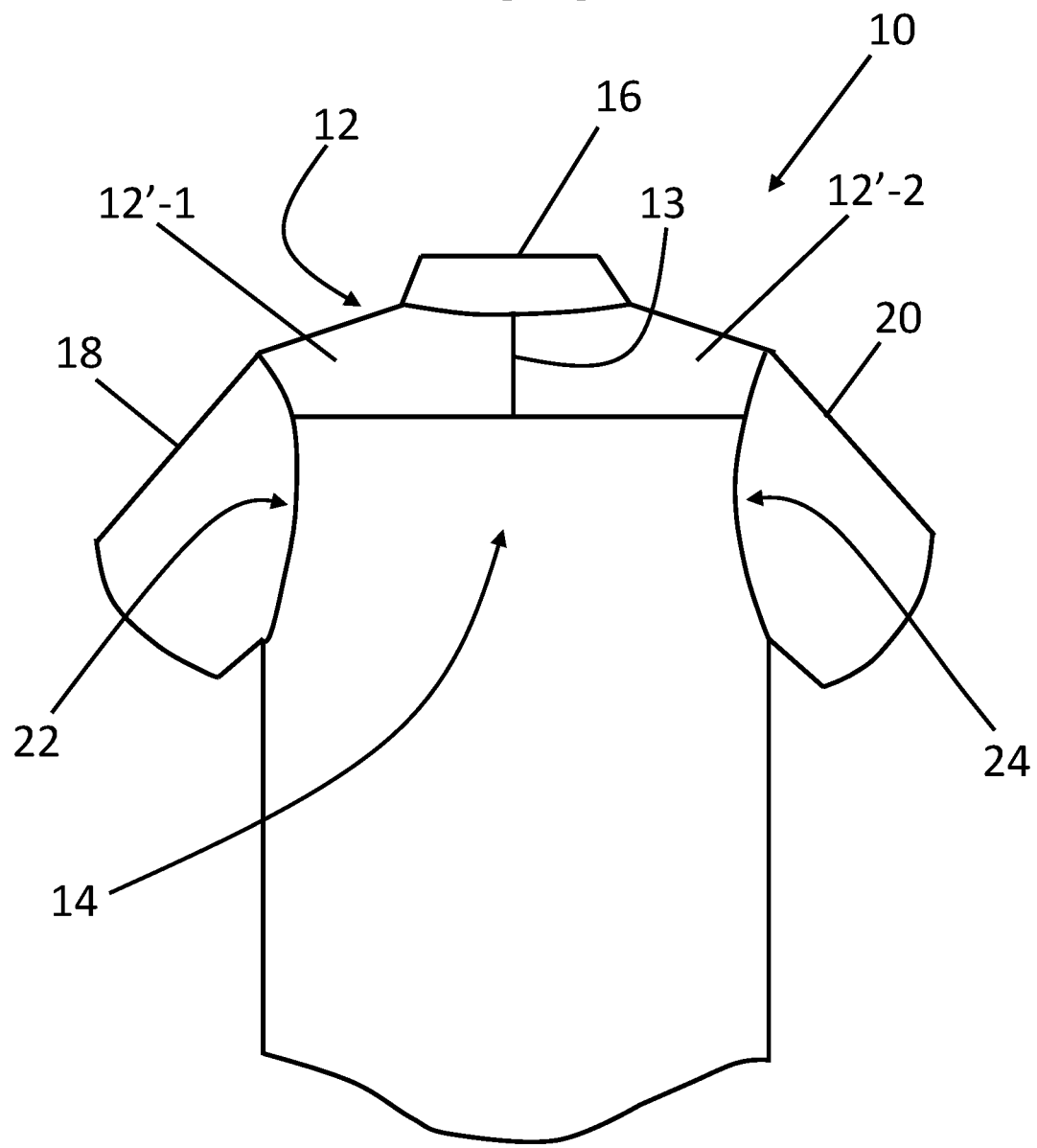
FIGS. 3-5 show aspects of a shirt yoke according to exemplary embodiments hereof.

The yoke 12 may be a plain yoke 12 as depicted in FIGS. 1A and 2A, or a split yoke 12' as depicted in FIG. 3. The plain yoke 12 may be generally formed from a single section from left to right across the back, and the split yoke 12' may be formed from two (or more) sections from left to right across the back. For example, the split yoke 12' may include a left section 12'-1 and a right section 12'-2 that when joined together at the seam 13 may generally form the split yoke 12'. Note that for purposes of this description, unless specifically stated otherwise, references, descriptions and details pertaining to the yoke 12 will refer to and be applicable to both a plain yoke 12 and a split yoke 12'.

Figure 4:
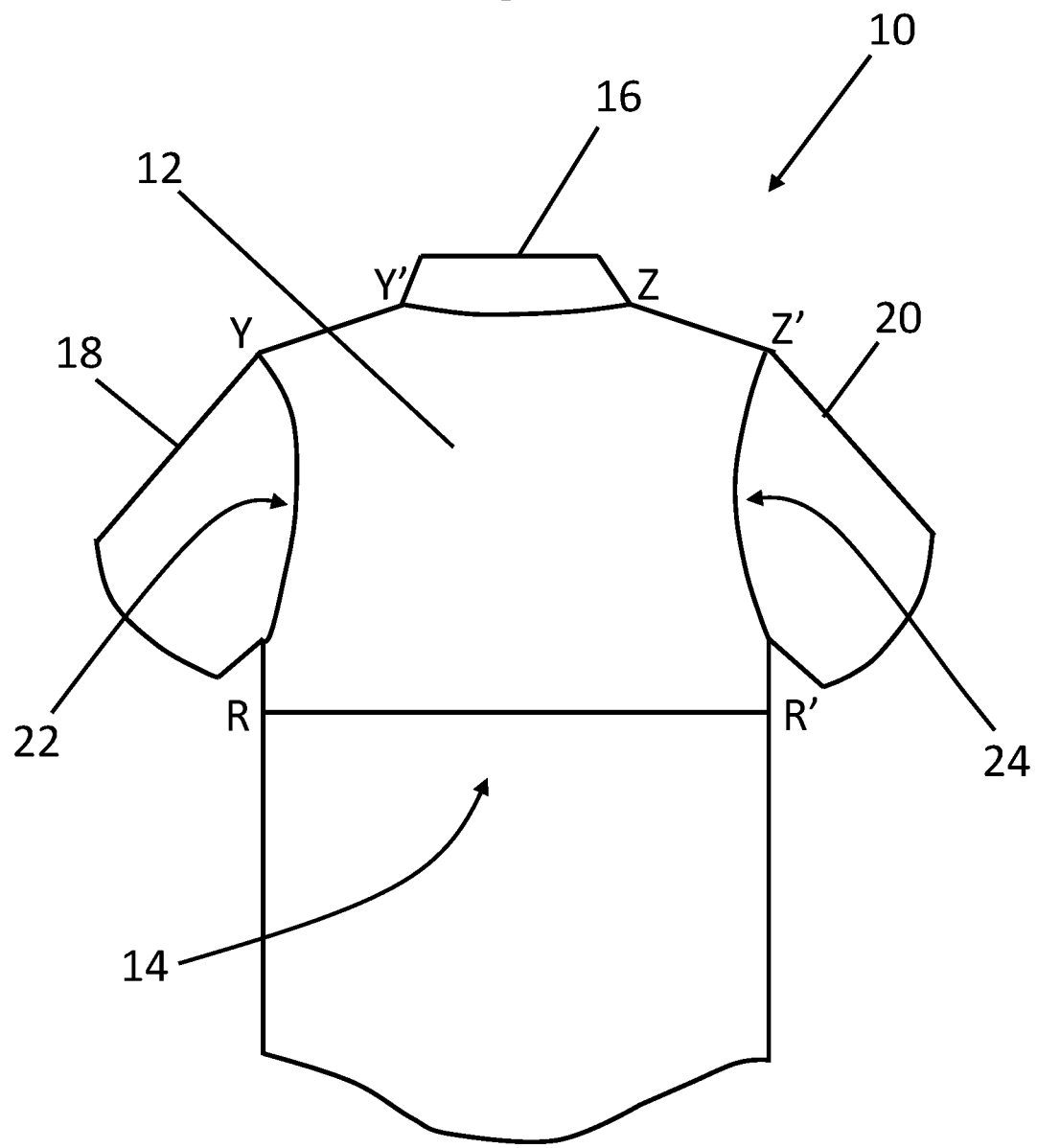

Turning now to FIG. 4, a yoke 12 according to exemplary embodiments hereof, may be attached to the shirt back body 14, e.g., by being sewn along the line R-R'. The yoke 12 may be attached to the other elements of the shirt 10, e.g., the collar 16, the shirt front body 15, the left sleeve 18 and the right sleeve 20 as described in other sections. It may be preferable that line R-R' may be positioned below the bottom of the left armhole 22 on the left and below the bottom of the right armhole 24 on the right. Line R-R' may generally be a straight line or may include curvatures, angles or other forms. In any event, it may be preferable that a substantial portion of the line R-R' be below a horizontal level defined by the bottom of the left armhole 22 and the bottom of the right armhole 24.

Figure 5:
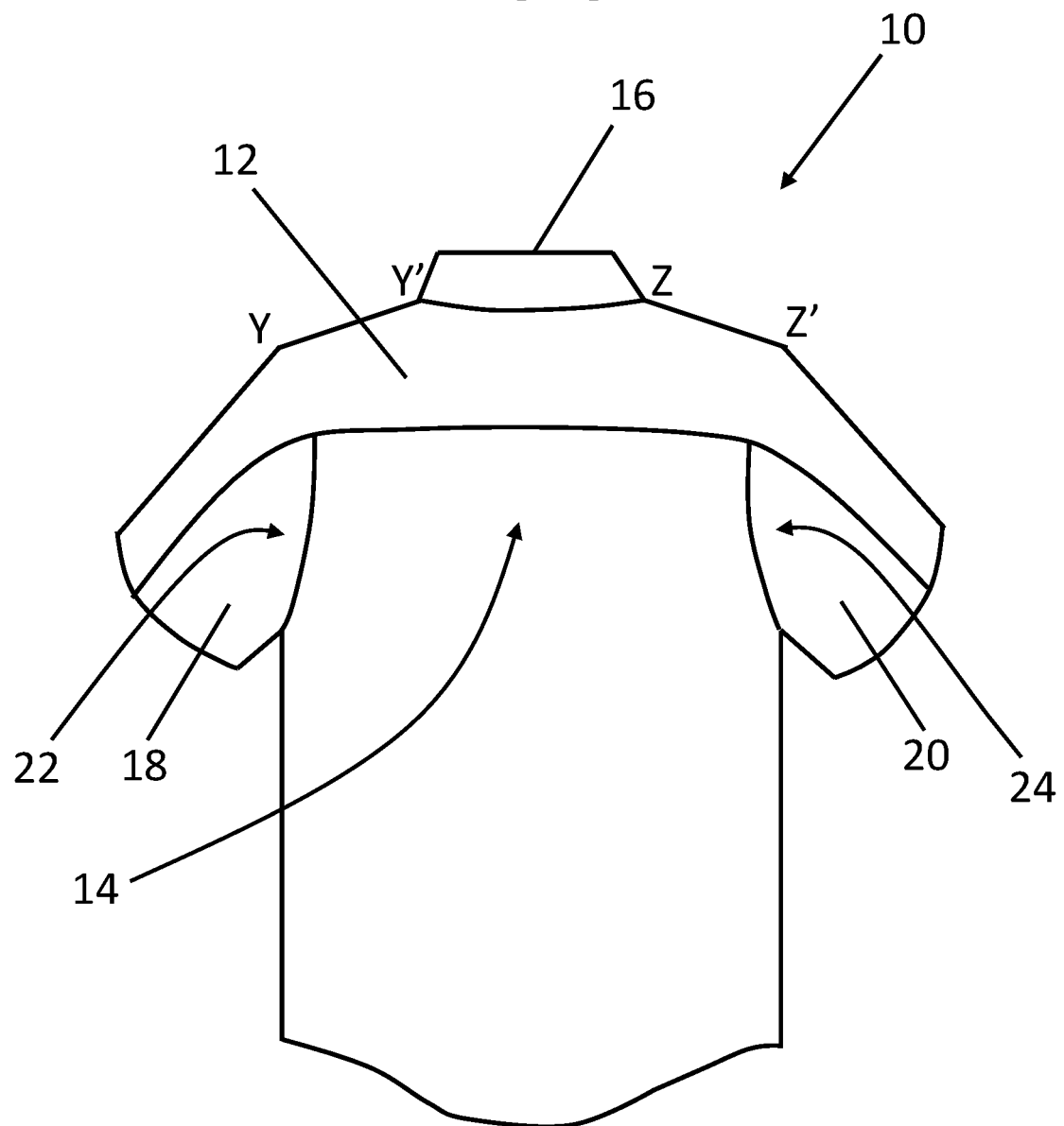

As shown in FIG. 5, the yoke 12 may also be configured with the left and right sleeves 18, 20 such that a left portion of the yoke may generally form a portion of the left sleeve 18, and a right portion of the yoke 12 may generally form a portion of the right sleeve 20. While FIG. 5 depicts the yoke 12 generally forming the top of the left and right sleeves 18, 20, the yoke 12 may form any portions of the left and right sleeves 18, 20.

It will be understood by a person of ordinary skill in the art, upon reading this specification, that the yoke 12 may include different curvatures, shapes and forms across all of its dimensions and lines, including but not limited to, the X-X', Y-Y', Y'-Z, Z-Z', X-Y, X'-Z', P-P', Q-Q' and R-R' dimensions and lines, and that the scope of the embodiments described herein are not limited to the curvatures, shapes or forms that the yoke 12 may include. It will also be appreciated by a person of ordinary skill in the art that any or all of the details, elements and characteristics described herein with regards to the yoke 12 are directly applicable to any yoke 12 described in relation to any embodiments herein regardless of the particular shapes, forms, dimensions, positions or configurations of the yoke 12. It will also be appreciated that the yoke 12 of the shirt 10 may generally include and/or be configured with any portions of the shirt 10 as required by the shirt 10 and/or by the exemplary embodiments described herein.

It is also understood that any of the embodiments of the yoke 12 and/or the split yoke 12' may include some or any combinations of the elements of the yoke 12 and/or the split yoke 12' as describe herein. For example, a yoke 12 that may include back and front sections as depicted in FIGS. 2A and 2B may also include, as its back section, the split yoke 12' as depicted in FIG. 3. This example is for demonstration purposes and it is clear that any and all other combinations of the various elements described herein regarding yokes 12 and yokes 12' may or may not be included in any of the embodiments described herein.

Figure 6A:
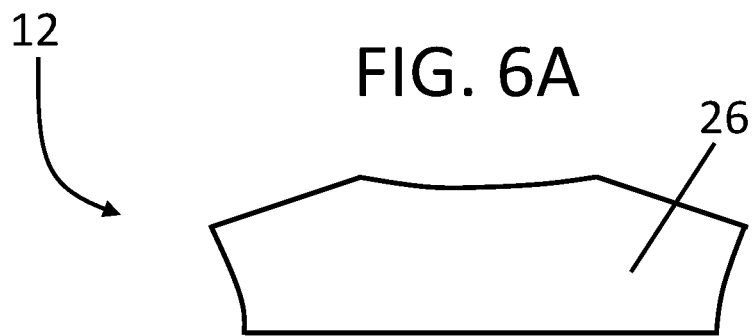
Figure 6B:
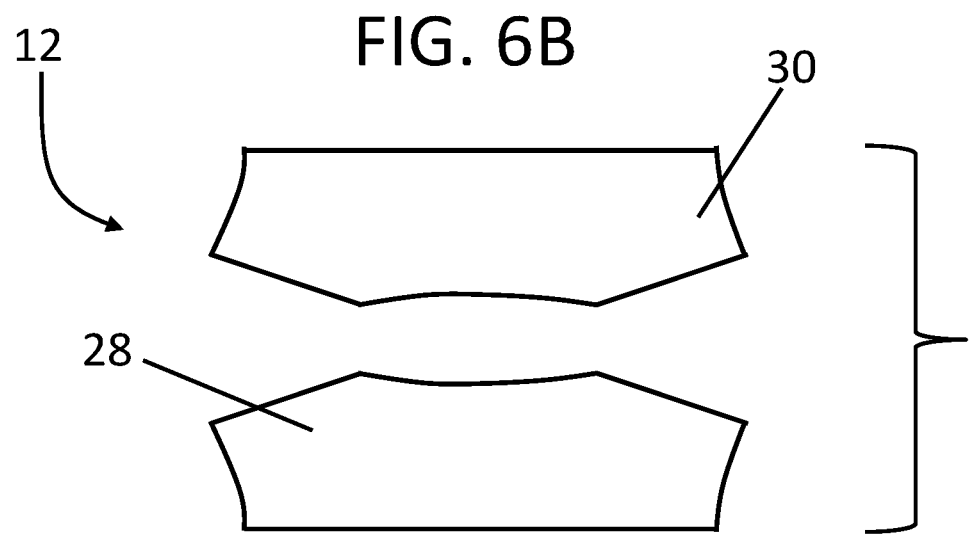

With reference now to FIGS. 6A and 6B, the yoke 12 may be formed from a single-ply of material (a single-ply piece), from a double-ply of material (a double-ply piece), or from any other number of plies and/or types of materials or pieces. For example, with reference to FIG. 6A, a yoke 12 according to exemplary embodiments hereof, may be formed from a single-ply piece 26.

In another example, with reference now to FIG. 6B, a yoke 12 according to exemplary embodiments hereof, may be formed from two pieces, an inner piece 28 and an outer piece 30. The inner piece 28 may be positioned on the inside of the shirt 10, when worn, while the outer piece 30 may be positioned on the outside of the shirt 10, when worn. The inner and outer pieces 28, 30 are preferably substantially matching in shape and may be overlaid to form the yoke 12. The yoke 12 may generally rest on the shoulders when attached to a shirt 10, and worn.

Note that the yoke 12 of FIGS. 6A and 6B may generally correspond to the yoke 12 of FIG. 1A. That is, the yoke 12 shown individually in FIGS. 6A and 6B may generally include the shape and form of the yoke 12 attached to the shirt 10 in FIG. 1A. For purposes of this description, the process and method by which the yoke 12 may be formed will be described in relation to the yoke 12 depicted in FIGS. 6A and 6B. However, it is understood that the yokes 12 depicted in FIGS. 6A and 6B are shown for demonstration purposes and that the yokes 12 of the other embodiments described herein may also be formed as described in this section. It is also understood that the material properties and benefits that may result due to the forming of the yoke 12 as described will apply to all of the yokes 12 in all of the embodiments included herein.

Thus, as explained, a yoke may comprise one or more pieces. As explained, a yoke 12 preferably comprises a self-fabric (e.g., the same self-fabric as used in the shirt), with at least some of the yoke 12 having stretch and recovery properties in at least one direction thereof, and preferably in at least two directions thereof. The stretch and recover directions may be opposing or non-opposing directions.

The yoke piece(s) having stretch and recovery may be formed in any known way. For example, the yoke piece(s) may be formed by fusing together a self-fabric with a fusible substrate (e.g., with a one-way, two-way, a four-way or an n-way fusible substrate where an n-way fusible substrate is a fusible substrate that provides stretch and recovery in n directions, and n may equal any number). Thus, each yoke piece having stretch and recovery may comprise a fused fabric composite formed from a fabric (e.g., the self-fabric of the shirt) having a fusible material attached thereto. A fusible substrate may also be referred to herein as a fusible. The material formed by fusing a self-fabric with a fusible substrate may be referred to as performance material.

The piece 26 (FIG. 6A) and/or the inner and outer pieces 28, 30 (FIG. 6B) may each be formed by fusing a self-fabric (e.g., the self-fabric of the shirt or any other type of fabric) with a fusible substrate. The fusible substrate used may preferably be a two-way fusible substrate, although other fusible substrates (e.g., one-way, four-way or n-way fusible substrates where an n-way fusible substrate is a fusible substrate that provides stretch and recovery in n directions, and n may equal any number) may also be used and are contemplated.

A two-way fusible substrate may be a fusible substrate that provides stretch and recovery in two directions thereof (preferably in non-opposing directions), typically, but not necessarily, perpendicular to each other.

For the purposes of this discussion, one of the stretch (and recovery) directions may be referred to as a horizontal direction. Preferably the fused material formed by fusing a self-fabric with a fusible substrate (i.e., the performance material) is formed with the horizontal direction of the fusible substrate substantially along the back width of the yoke 12.

As used herein, with reference to the stretch (and/or recovery) properties of a material, a direction may refer to a single direction with respect to a particular point or location or orientation or to substantially opposing directions with respect to that particular point or location or orientation. The term "opposing directions" refers to directions that are at or about 180 degrees opposed to each other. In other words, directions that are substantially opposed to each other. Thus, e.g., with respect to a midpoint on the back of a shirt (or a midpoint on a yoke), a particular fabric having horizontal stretch (and recovery) has stretch (and recovery) to the left and right (i.e., in two opposing directions).

In some preferred embodiments the fusible substrate is a two-way fusible substrate having greater stretch in the horizontal or length direction thereof, preferably about 90% horizontal stretch, with the other direction of stretch being about 10%. In other preferred embodiments, the two-way fusible substrate may have somewhat equal stretch and recovery in the horizontal and vertical directions. The two-way fusible substrate may also have other amounts of stretch and recovery in the horizontal direction compared to the vertical direction, and the scope of the embodiments described herein is not limited by the amounts of stretch and recovery that the fusible may have in any direction with respect to any other direction.

The self-fabric used to form the piece 26 and/or the inner and outer pieces 28, 30 may be any general shirting fabric, including, for example, cotton, poly-cotton, linen, etc. The self-fabric may also be rigid material, mechanical stretch material, stretch material (e.g., Lycra or Spandex), or other types of materials (e.g., a compacted woven material, or a compacted knit material). The self-fabric may comprise a mesh. The self-fabric may, but need not be, the same fabric as the shirt's. The shirt may use more than one self-fabric.

The self-fabric used to form the piece 26 and/or the pieces 28, 30 may be cut in any way, including, e.g., along its length, breadth, or on a bias. This includes sections 12'-1 and 12'-2 that may be used to form the split yoke 12'.

The self-fabric used to form the piece 26 and/or the pieces 28, 30 may initially be with or without stretch (e.g., a compacted woven or compacted knit material).

In some embodiments, the piece(s) of the yoke 12 (i.e., the piece 26 and/or the inner and outer pieces 28, 30) may be formed by first compacting the underlying self-fabric to give it stretch properties, and then combining the compacted underlying self-fabric with the fusible substrate (to control and give memory to the stretch imposed by the compaction). As should be appreciated, the underlying self-fabric has the capacity to extend, and that the extension and recovery is affected by the fusible substrate.

Figure 7A:
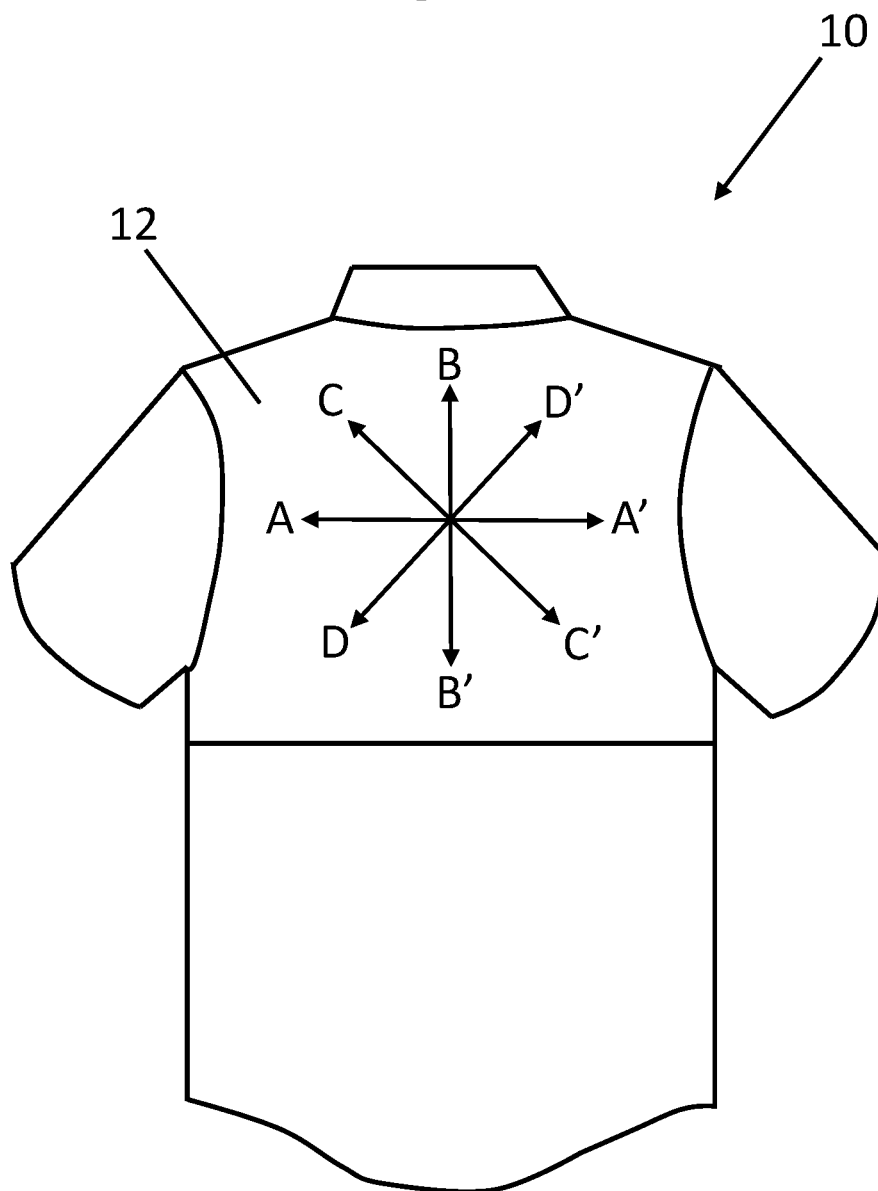

As shown in FIG. 7A, the yoke 12 (e.g., piece 26 and/or the inner and outer pieces 28, 30 and/or other types of yokes 12) may preferably be formed from fabric having stretch and recovery in one, two or other numbers of directions. In one exemplary embodiment, the yoke 12 may preferably have stretch and recovery in a substantially horizontal direction (e.g., generally parallel to the across the back width, generally in the direction of arrowed line A-A' in FIG. 7A, from left to right and right to left). In another exemplary embodiment, the yoke 12 may preferably have stretch and recovery in a substantially vertical direction (e.g., generally vertical to the across the back width, generally in the direction of arrowed lines B-B' in FIG. 7A, from up to down and down to up).

In addition (or instead), in some exemplary embodiments the yoke 12 may include stretch and recovery in other directions that may be at different angles (offset angles) with respect to the vertical or horizontal directions (e.g., in the directions of arrowed lines C-C' and/or D-D' in FIG. 7A). Note that while the directions of stretch and recovery represented by the angled arrow lines C-C' and D-D' may be shown in the drawing in FIG. 7A as generally offset at approximately 45 degrees with respect to lines A-A' and B-B', the directions of stretch and recovery represented by the lines C-C' and D-D' may be offset at any angles or any combinations of angles with respect to arrowed lines A-A' and B-B'.

Furthermore, it is understood that the yoke 12 may include stretch and recovery properties in multiple directions simultaneously. For example, the yoke 12 may simultaneously include stretch and recovery in the horizontal direction (e.g. in the direction of arrowed lines A-A') as well as in the directions of any offset angles represented by the angled arrow lines C-C' and D-D'. Recall that while the arrowed lines C-C' and D-D' are depicted as being generally 45 degrees with respect to the horizontal arrowed lines A-A', the angled arrowed lines C-C' and D-D' may represent directions of stretch and recovery at any offset angles with respect to the arrowed lines A-A'. The yoke 12 may include stretch and recovery properties simultaneously in multiple directions, and each direction may be at any offset angle with respect to the offset angles represented by the arrowed lines C-C' and D-D'. This example is meant for demonstration purposes and it is understood by a person of ordinary skill in the art that the yoke 12 may include stretch and recovery properties simultaneously in any combination of angles and/or directions.

While the yoke 12 may have substantial stretch and recovery in the vertical and horizontal directions, the yoke 12 may have at least some stretch and recovery in any other direction with respect to the yoke 12. Furthermore, while preferable embodiments have primary stretch and recovery (i.e., the most stretch and recovery) in substantially the horizontal direction (i.e., along line A-A' in FIG. 7A), and/or in substantially the vertical direction (i.e., along the line B-B' in FIG. 7A), other embodiments may have primary stretch and recovery in any other directions or angles or in any combination of other directions or angles.

Those of ordinary skill in the art will appreciate and understand, upon reading this description, that the direction of a yoke's primary stretch and recovery may also depend on the type of activities the wearer will perform when wearing the shirt. For example, a work shirt worn as part of a uniform by a delivery driver may need primary stretch and recovery in the horizontal direction, whereas a shirt worn by someone lifting their arms above shoulder height may need primary stretch and recovery at a non-zero angle from the horizontal (e.g., along lines D-D' and C-C' in FIG. 7A).

While the arrowed lines in FIG. 7A show four generally opposing directions (A-A', B-B', C-C', D-D'), those of ordinary skill in the art will appreciate and understand, upon reading this description, that any directions or number of directions are possible. Furthermore, the angles between the arrowed lines in FIG. 7A are not to scale or representative of actual angles.

In some exemplary embodiments hereof, it may be preferable for the yoke 12 to have stretch and recovery of at least 1.5 to 2.0 inches in the horizontal direction (e.g., across a wearer's back). However, lesser or greater amounts of stretch and recovery may also be used and are contemplated herein.

Recall that a yoke 12 may be comprised of sections (e.g., the split yoke 12' of FIG. 3 comprised of sections 12'-1 and 12'-2, and/or the yoke 12 of FIG. 2B that may include back and front sections). When the yoke 12 is comprised of sections, some or all of the sections of the yoke 12 may be formed, at least in part, as described above, with a self-fabric and a fusible substrate, and then connected (e.g., stitched) to form the overall yoke 12. A yoke 12 that may be formed of sections may have the same or similar stretch and recovery properties as a yoke 12 formed from a piece 26 and/or pieces 28, 30 as described. However, those of ordinary skill in the art will appreciate and understand, upon reading this description, that a yoke 12 formed of sections may have stretch and recovery properties in multiple directions. For example, different component pieces may have different stretch and recovery properties (e.g., stretch and recovery properties in different directions or with different amounts of stretch).

For example, as shown in FIG. 6C, the split yoke 12' (of FIG. 3) may be formed from two sections (e.g., sections 12'-1 and 12'-2) of a single-ply of material (a single-ply piece), of a double-ply of material (a double-ply piece), or of any other number of plies or types of materials or pieces. In this example, with reference to FIG. 6C, a yoke 12' according to exemplary embodiments hereof, may be formed from two single-ply pieces 26'-1 and 26'-2 that may be cut along their length, breadth, or on a bias (or any combination thereof). The single-ply pieces 26'-1 and 26'-2 may be formed with a fusible substrate (e.g., as described above with reference to piece 26) and then joined (e.g., sewn together) to form the split yoke 12' as described above with relation to FIG. 3.

Continuing with this example, with reference now to FIG. 6D, a split yoke 12' according to exemplary embodiments hereof, may be formed from two sets of substantially matching pieces. A first set may comprise a left inner piece 28'-1 and a left outer piece 30'-1, and a second set may comprise a right inner piece 28'-2 and a right outer piece 30'-2. The pieces 28'-1, 30'-1, 28'-2 and 30'-2 may be cut along their length, breadth, or on a bias (or in any combination thereof) and may be formed with a fusible substrate (e.g., as described above with relation to pieces 28 and 30). The left inner piece 28'-1 and the right inner piece 30'-1 may be joined together as described above with relation to the split yoke 12' in FIG. 3 to form a combined inner yoke 12' piece, and the left outer piece 28'-2 may similarly be joined with the right outer piece 30'-2 to form a combined outer yoke 12' piece. The combined inner yoke 12' piece may be positioned on the inside of the shirt 10, when worn, while the combined outer yoke 12' piece may be positioned on the outside of the shirt 10, when worn. The inner and outer yoke 12' pieces (e.g., the pieces formed by joining pieces 28'-1 and 30'-1, and pieces 28'-2 and 30'-2, respectively) may be overlaid to form the split yoke 12'.

The split yoke 12' described with reference to FIGS. 6C and 6D may have similar stretch and recovery properties as the yoke 12 described with reference to FIGS. 6A and 6B. These exemplary stretch and recovery properties are described above with reference to FIG. 7A. In addition, the left yoke section 12'-1 and the right yoke section 12'-2 may also include stretch and recovery properties that may be independent of each other. That is, the left yoke section 12'-1 may have the ability to stretch and recover in directions and angles that may be independent of (and/or distinct from) those of the right yoke section 12'-2, and vice versa. In fact, each section of the split yoke 12' (e.g. 12'-1 and 12'-2) may each individually include the same or similar stretch and recovery properties as described with respect to the piece 26 and/or the inner and outer pieces 28, 30 of FIGS. 6A and 6B respectively with reference to FIG. 7A. The stretch and recovery properties as described may also depend on the particular type of upper body movement expected, the cut of the yoke pieces 28'-1, 30'-1, 28'-2 and 30'-2 (e.g., along their length, breadth, on a bias or any combination thereof), the location and shape of the seam(s) used to join the sections 12'-1 and 12'-2 to form the split yoke 12' (e.g., seam 13), and other factors. Exemplary directions of stretch and recovery are depicted by the arrowed lines in FIG. 7B.

As with the yoke 12 (described above with reference to FIG. 7A), each section 12'-1 and 12'-2 of the spit yoke 12' as depicted in FIG. 7B may have stretch and recovery in the general horizontal directions (e.g., along arrowed lines A-A' and E-E', respectively), in the general vertical directions (e.g., along arrowed lines B-B' and F-F', respectively), and in any offset angled directions (e.g., along arrowed lines C-C' and D-D', and G-G' and H-H', respectively). Note that while the directions of the stretch and recovery represented by the angled arrow lines C-C' and D-D', and G-G' and H-H' may be shown as generally offset at approximately 45 degrees with respect to arrowed lines A-A' and B-B', and E-E's and F-F', respectively, the directions of the stretch and recovery represented by the angled arrowed lines C-C' and D-D', and E-E' and F-F' may be offset at any angles or any combinations of angles with respect to arrowed lines A-A' and B-B', and E-E' and F-F'. While each section 12'-1, 12'-2 of the yoke 12' may have substantial stretch and recovery in the vertical and horizontal directions, each section 12'-1, 12'-2 may have at least some stretch and recovery in any other directions with respect to the yoke 12'.

Note that the sets of arrowed lines shown in the left section 12'-1 and those in the right section 12'-2 of the split yoke 12' FIG. 7B are provided in the drawings for descriptive purposes, and it should be clear that the left section 12'-1 and the right section 12'-2 may stretch and recover in the same or similar directions and angles with respect to each other, in different angles and directions with respect to each other, or in any combination thereof.

In one example, depending on upper body motion of the wearer, the left section 12'-1 of the split yoke 12' may stretch and recover predominantly in the direction of the arrows A-A' while the right section 12'-2 may stretch and recovery predominantly in the direction of the arrows F-F'. In another example, the left section 12'-1 may stretch and recover predominantly in the direction of the arrows C-C' while the right section 12'-2 may stretch and recovery predominantly in the direction of the arrow H-H'. In yet another example, the left section 12'-1 may stretch and recover predominantly in the direction of the arrows A-A' while the right section 12'-2 may stretch and recovery predominantly in the direction of the arrows E-E'. In this example, the split yoke 12' may generally stretch and recover across the back width of the shirt 10. It is clear that these examples are meant for demonstration purposes and it will be appreciated by a person of ordinary skill in the art, upon reading this specification, that the left section 12'-1 and the right section 12'-2 may have stretch and recovery properties in any direction and/or angles with respect to each other.

In the case of the yoke 12 of FIG. 2B that may include a back section and a front section, each back section and front section may include stretch and recovery properties as described above in relation to the embodiments of the yoke 12 and the split yoke 12'. That is, each component of the yoke 12 may each individually include the same or similar stretch and recovery properties as described with respect to the piece 26 and/or the inner and outer pieces 28, 30 of FIGS. 6A and 6B respectively with reference to FIG. 7A. For example, as shown in FIG. 7C, the left front section may include stretch and recovery properties along the directions of arrows I-I', J-J', K-K', and L-L', and the right front section may include stretch and recovery properties along the arrows M-M', N-N', O-O', and S-S'. As with the other embodiments of the yoke 12 and the yoke 12' described above with relation to FIGS. 7A and 7B, the left front section and the right front section may have stretch and recovery in the generally horizontal direction (e.g., along arrows I-I' and M-M', respectively) and/or in the generally vertical direction (e.g., along arrows J-J' and N-N', respectively), and/or in offset angled directions (e.g., along arrows K-K' and L-L', and O-O' and S-S', respectively). It is also clear, that as with the other embodiments of the yoke 12 and the split yoke 12', that the stretch and recovery in the directions represented by the offset angles (e.g., along arrows K-K' and L-L', and O-O' and S-S', respectively) may be at any angles with respect to the horizontal directions (e.g., arrows I-I' and M-M', respectively), at any angles with respect to vertical directions (e.g., arrows J-J' and N-N', respectively), and at any angles with respect to any offset angled directions (e.g., arrows K-K' and L-L', and O-O' and S-S', respectively).

It is appreciated that the left front section and the right front section of the yoke 12 may also include stretch and recovery properties that may be independent of each other. The sets of arrowed lines shown in the left front section and the right front section of the yoke 12 of FIG. 7C are for conceptual and descriptive purposes only, and it should be clear that the left front section and the right front section may stretch and recover in the same or similar directions and angles with respect to each other, in different angles and directions with respect to each other, or in any combination thereof.

As with the arrowed lines in FIG. 7A, the angles between the arrowed lines in FIG. 7C are not to scale or representative of actual angles. And, as with the arrowed lines in FIG. 7A, those of ordinary skill in the art will appreciate and understand, upon reading this description, that any directions or number of directions are possible for stretch and recovery in the yoke in FIG. 7C.

The yoke 12 described herein provides numerous advantages over prior approaches. As is known in the art, when a shirt is worn, movements made by the upper body of the user (e.g., reaching forward to pick up a box) may cause the back of the shirt 10 (including the yoke 12) to become taut, causing the sleeves 18, 20 and armholes 22, 24 to bind on the wearer. The yoke 12 described herein provides the ability of the shirt 10 to expand to better accommodate upper body movements, thus minimizing the tautness and binding of the garment. Having stretched or expanded, when the motion is over the yoke 12 is then able to return substantially to its original dimensions (due to the recovery properties imparted by the fusible). This may provide a much higher level of comfort to persons who may wear the shirt 10 configured with the yoke 12 while performing duties that may involve moving their upper body. Note that the yoke 12 described, e.g., in relation to FIG. 4, may provide significant such benefits because the yoke 12 may extend to a position below the bottom of the armholes 22, 24 (e.g., along lines R-R'). In this way, the yoke 12 may provide additional stretch and recovery in the area of the armholes 22, 24 which may allow for a greater overall amount of stretch and recovery during upper body movements.

In any of the embodiments described herein, the yoke 12 may be configured with the shirt 10 such that a self-fabric layer may be facing outward (away from the body when worn) or inward (facing the body when worn). In addition, the yoke 12 may be configured with the shirt 10 such that the fusible substrate may be facing outward (away from the body when worn) or inward (facing the body when worn). The self-fabric and/or the fusible substrate may be printed with a pattern or may be unprinted. When the fusible may be facing towards the body when worn, the fusible may wick moisture (e.g., perspiration) away from the body to give the material additional performance. This may be especially effective when the yoke 12 is formed of a single-ply material.

Although embodiments hereof have been described with respect to a shirt, it should be appreciated that the garment may be any garment that incorporates a yoke (e.g., a shirt, an overall, a dress, a jacket, a hooded garment—a so-called "hoodie," etc.). The garment may have any purpose. For example, the garment may be a dress garment (e.g., a dress shirt) or a work garment (including, e.g., a uniform).

EXAMPLES

Some examples are provided here. These examples are not intended to limit the scope hereof in any way.

FIGS. 8A-8E, 9A-9D, 10A-10F, 11A-11C, and 12A-12B show example yokes according to embodiments hereof.

The arrows in the drawings in FIGS. 8A-8E and 9A-9D show at least one direction of stretch and recovery of the yokes or yoke portions. Those of ordinary skill in the art will appreciate and understand, upon reading this description, that the directions of stretch (and recovery) shown in these examples are only exemplary, and different and/or other directions of stretch and recovery may be provided.

Example 1

A yoke is formed from a first fused fabric composite material and a second material. The first fused fabric composite has stretch and recovery properties in first opposing directions. The second material may or may not be a fused fabric composite material. The yoke is attached to a garment (e.g., a shirt, an overall, a jacket, a hooded garment, a "hoodie," and a dress, etc.), e.g., as described above.

Example 1.1

Figure 8A:
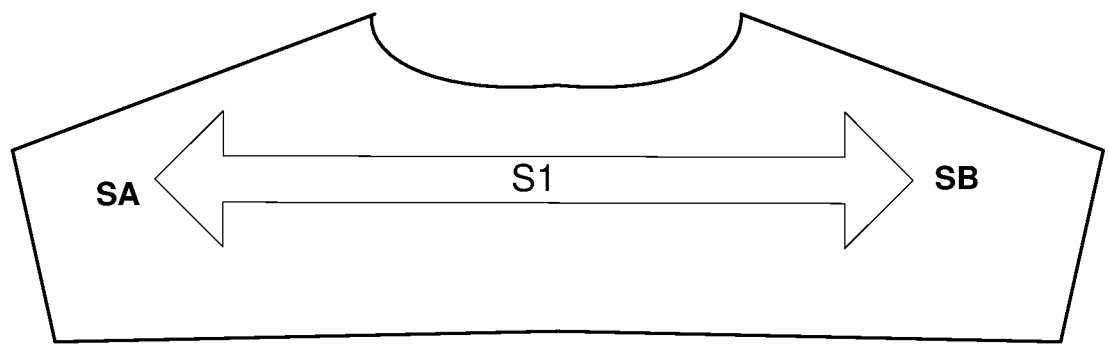
FIGS. 8A-8E, 9A-9D, 10A-10F, 11A-11C, and 12A-12B show example yokes according to embodiments hereof.

The yoke of example 1 is attached to the garment with the yoke's primary (or greater) stretch and recovery directions being substantially across the back of the garment, from left armhole to right armhole (see, e.g., FIG. 8A, with primary stretch and recovery direction (denoted S1 in the drawing) being SA to SB, e.g., and preferably, from left to right).

Example 1.2

Figure 8B:
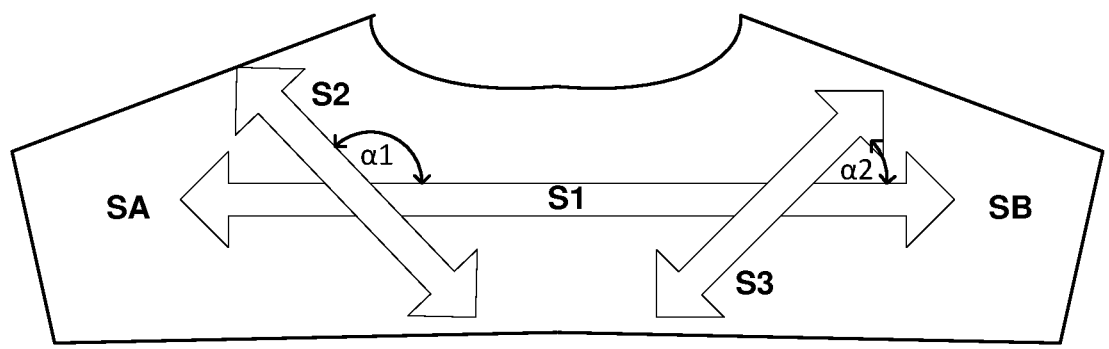

The yoke of examples 1 or 1.1 also has stretch and recovery properties in at least one second direction (denoted S2 and S3 in the drawing). The second direction(s) are at least one non-zero angle to the first direction (See, e.g., FIG. 8B). As depicted in FIG. 8B, the first stretch direction (from SA to SB, e.g., left-to-right) is denoted S1, and the second stretch directions are denoted S2, at a non-zero angle $\alpha 1$ to direction S1 and S3, at a non-zero angle $\alpha 2$ to direction S1.

As shown in the drawing, preferably angles $\alpha 1$ and $\alpha 2$ are complementary (i.e., $\alpha 1 = 180 - \alpha 2$). The non-zero angles ($\alpha 1$ and $\alpha 2$) are preferably symmetric and may, but need not be, 90 degrees. In some cases the two angles may be about 45 degrees.

Example 1.3

Same as examples 1, 1.1, or 1.2, where the fused fabric composite material is formed by fusing together a self-fabric with a fusible substrate (e.g., with a two-way or a four-way fusible substrate).

Example 1.4

Same as example 1.3, where the self-fabric is the same fabric as used for at least some other components of the garment.

Example 1.5

Same as examples 1.3 or 1.4, where the second non-composite fabric is the self-fabric.

Example 1.6

Same as examples 1 to 1.5, where the second fabric is a non-composite fabric.

Example 1.7

Same as examples 1 to 1.6, where the second fabric is a fused composite fabric having stretch and recovery properties in at least two opposing directions thereof.

Example 1.8

Same as the previous examples, where the first fused fabric comprises any general shirting fabric, including, for example, cotton, poly-cotton, linen, a garmenting fabric, a compacted woven material, a compacted knit material, etc.

Example 1.9

Same as the previous examples, where the second fabric comprises any general shirting fabric, including, for example cotton, poly-cotton, linen, a garmenting fabric, a compacted woven material, a compacted knit material, etc. The second fabric may, but need not be, the same as the first fabric.

Example 1.10

Same as the previous examples, where the first fused fabric and/or the second fabric each comprise a mesh.

Example 2

A two-part or split yoke is formed from two substantially mirrored pieces, each formed from a first fused fabric composite material and a second fabric. The second material may or may not be a fused fabric composite material. The first fused fabric composite has stretch and recovery properties in at least first opposing directions. Each yoke piece has stretch and recovery properties in at least first opposing directions. The two yoke pieces are joined to form the yoke, which is attached to a garment (e.g., a shirt, an overall, a jacket, a hooded garment, a "hoodie," and a dress, etc.), e.g., as described above.

Example 2.1

Figure 8C:
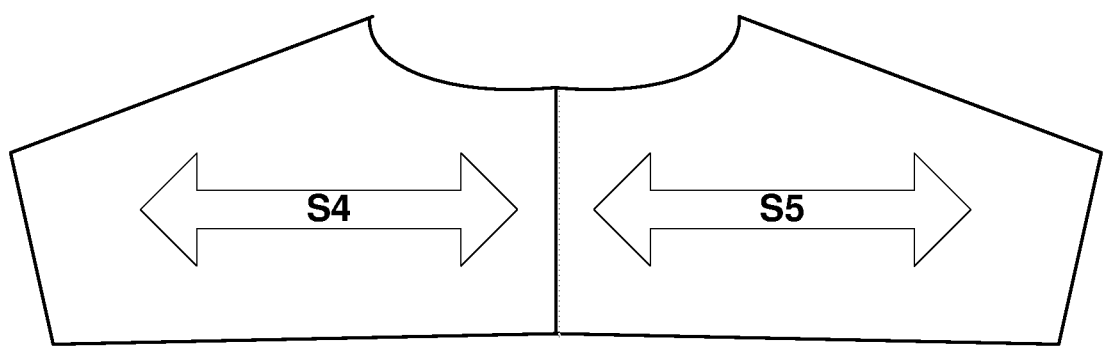
Figure 8D:
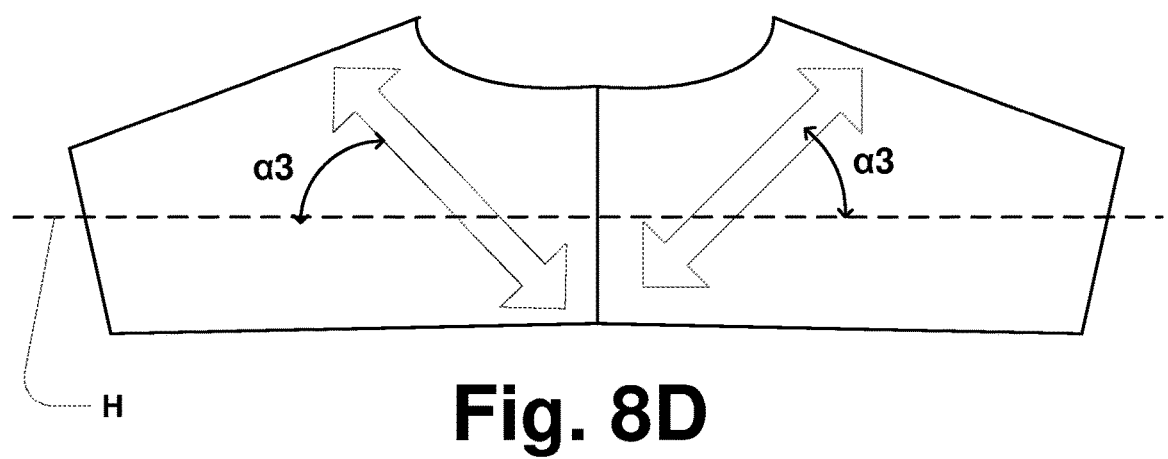
Figure 8E:
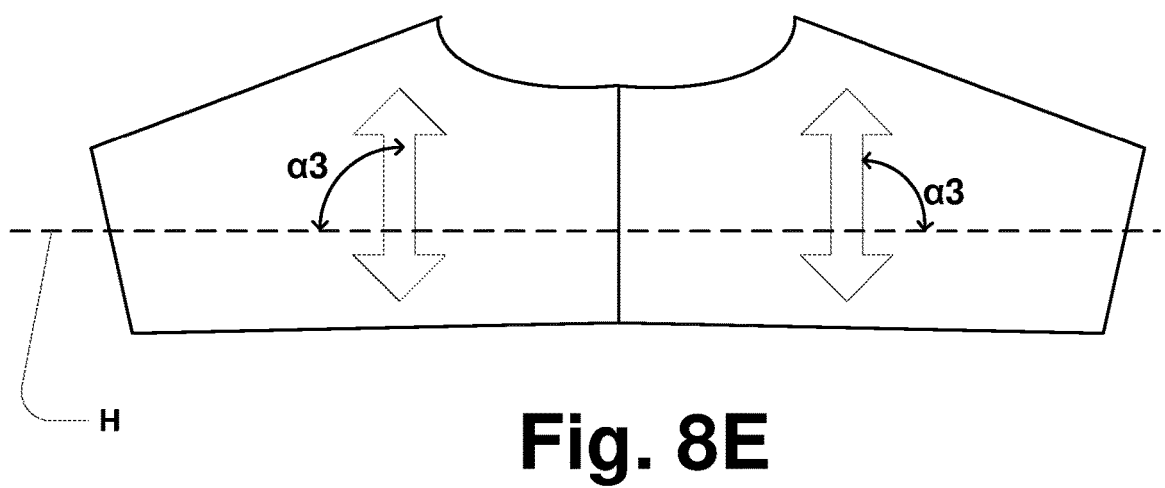
Figure 9A:
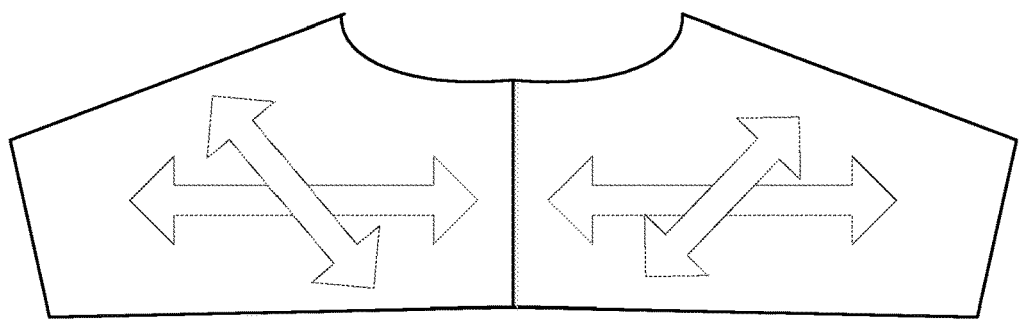
Figure 9B:
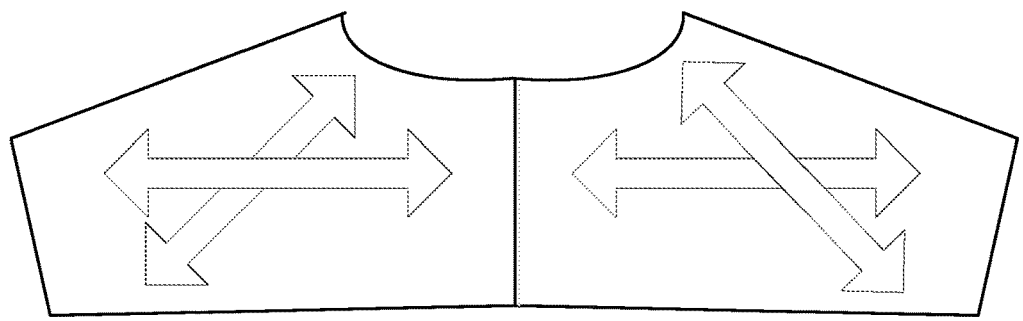
Figure 9C:
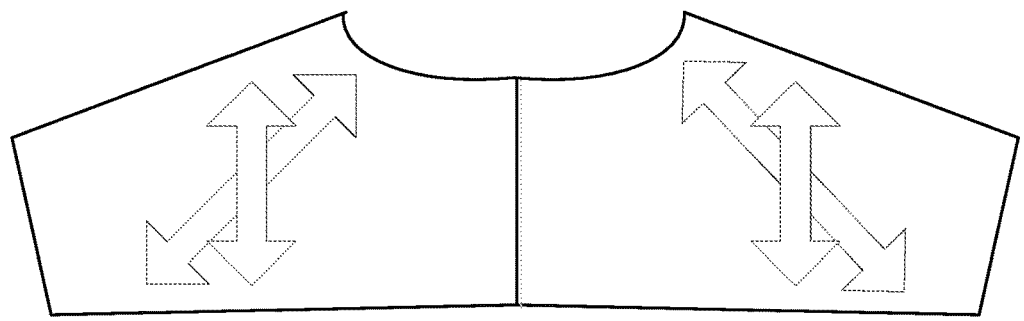
Figure 9D:
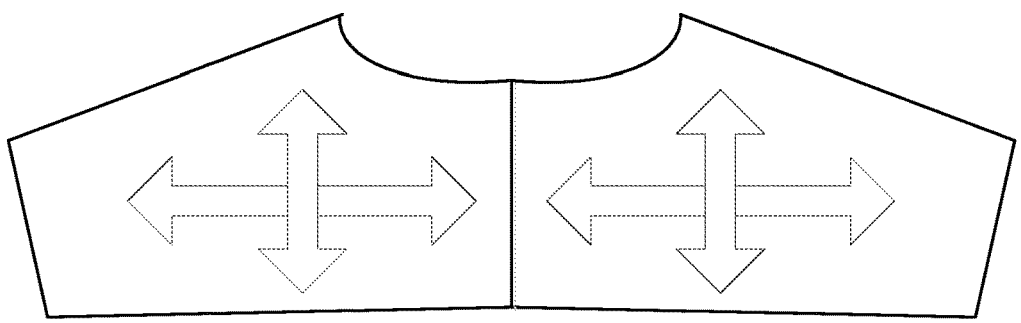

The split yoke of example 2 is attached to the garment with the primary (or greater) stretch and recovery directions of both yoke pieces being substantially across the back of the garment, from left armhole to middle and middle to right armhole (see, e.g., FIG. 8C). As shown in FIG. 8C, the left side has stretch in direction S4 and the right side has stretch in direction S5. The directions S4 and S5 may, but need not be, the same (e.g., left to right). If the directions are not the same, then they are preferably symmetric with respect to the middle of the yoke. For example, as shown in FIG. 8D, each of the stretch directions is at an angle (denoted α3) to a horizontal line (denote H) across the back of the garment. The angle α3 may be any angle from about 1 degree to about 179 degrees. In the example shown in FIG. 8E, the angle α3 is about 90 degrees.

Example 2.2

The split yoke of examples 2 or 2.1 also has stretch and recovery properties in at least a second direction, at a non-zero angle to the first direction (see, e.g., FIGS. 9A-9D).

Example 2.3

Same as examples 2, 2.1, or 2.2, where the fused fabric composite material is formed by fusing together a self-fabric with a fusible substrate (e.g., with a two-way or a four-way fusible substrate).

Example 2.4

Same as example 2.3, where the self-fabric is the same fabric as used for at least some other components of the garment.

Example 2.5

Same as examples 2.3 or 2.4, where the second non-composite fabric is the self-fabric.

Example 2.6

Same as examples 2 to 2.4, where the second fabric is a non-composite fabric.

Example 2.7

Same as examples 2 to 2.6, where the second fabric is a fused composite fabric having stretch and recovery properties in at least two opposing directions thereof.

Example 2.8

Same as the previous examples (2 to 2.7), where the first fused fabric comprises any general shirting fabric, including, for example, a garmenting fabric, cotton, poly-cotton, linen; a compacted woven material, a knit material, a mesh, and a compacted knit material, etc.

Example 2.9

Same as the previous examples (2 to 2.8), where the second fabric comprises any general shirting fabric, including, for example, a garmenting fabric, cotton, poly-cotton, linen; a compacted woven material, a knit material, a mesh, and a compacted knit material etc.

Example 3

A yoke, including front portions, is formed from a first fused fabric composite material and a second material. The first fused fabric composite has stretch and recovery properties in first opposing directions. The second material may or may not be a fused fabric composite material. The yoke is attached to a garment (e.g., a shirt, an overall, a jacket, a hooded garment, and a dress, etc.), e.g., as described above.

Example 3.1

Figure 10A:
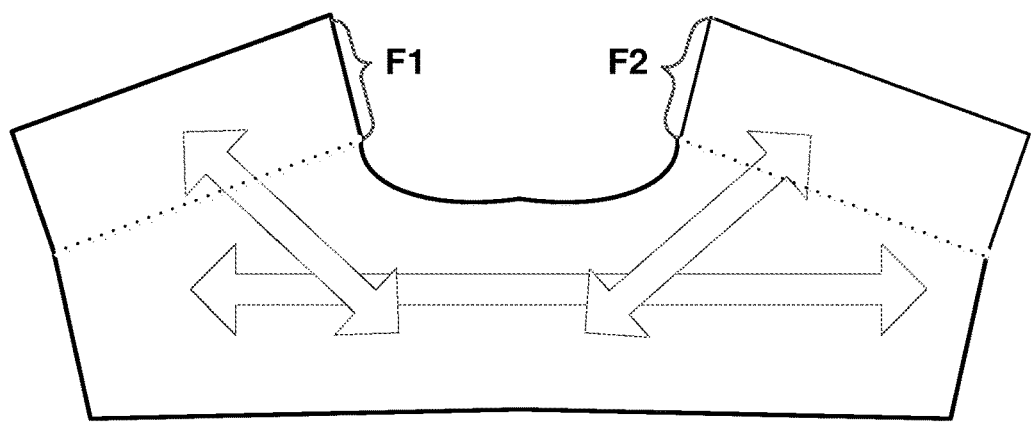

The yoke of example 3 is attached to the garment with the yoke's primary (or greater) stretch and recovery directions being substantially across the back of the garment, from left armhole to right armhole (see, e.g., FIG. 10A, with primary stretch and recovery direction being, e.g., and preferably, from left to right). In FIG. 10A, the front portions or pieces of the yoke are denoted F1 and F2.

The yoke, including the front pieces, may be formed as a single piece or from multiple pieces, joined appropriately.

Example 3.2

Figure 10B:
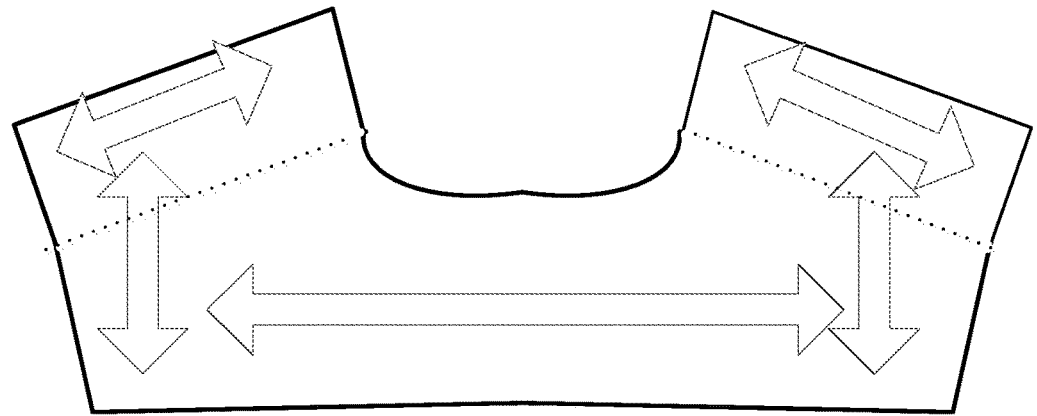
Figure 10C:
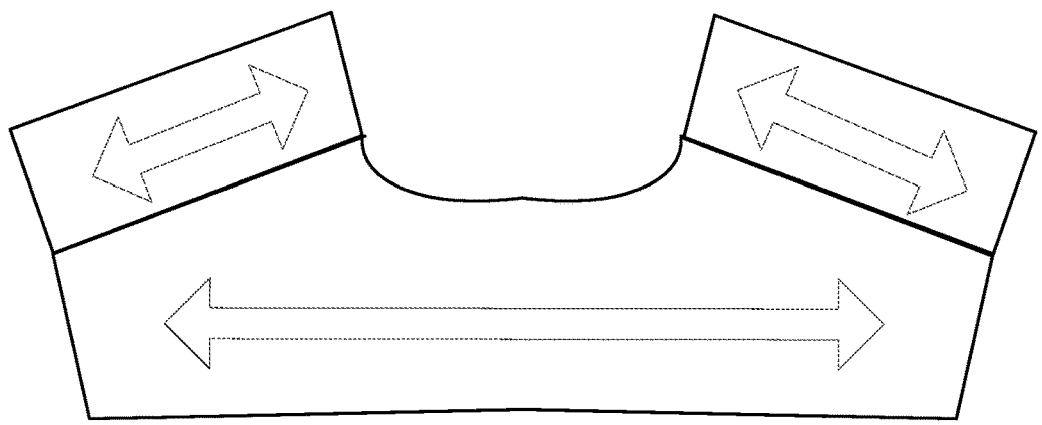
Figure 10D:
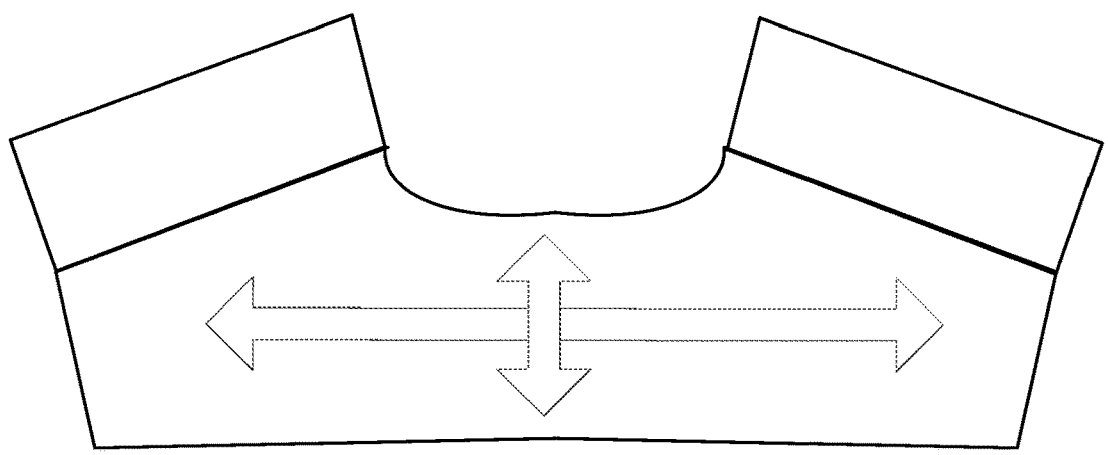
Figure 10E:
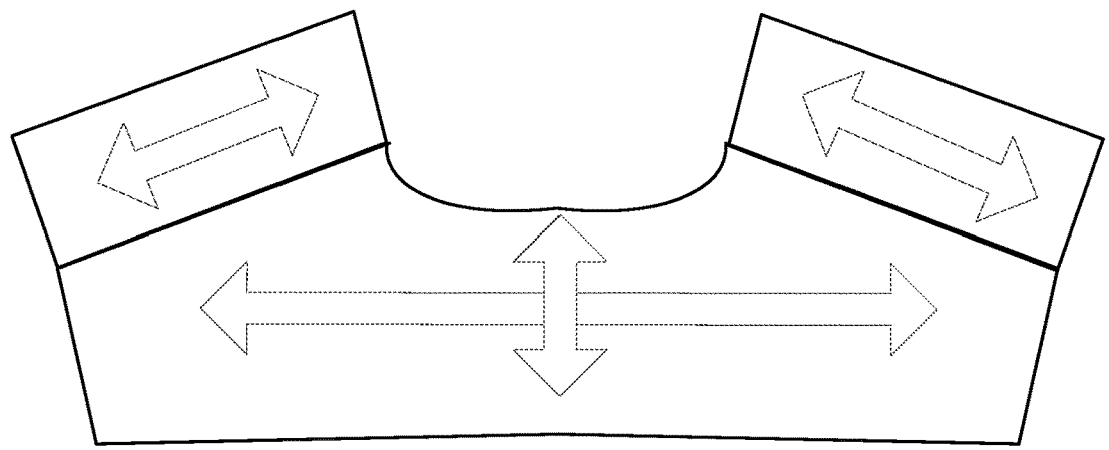
Figure 10F:
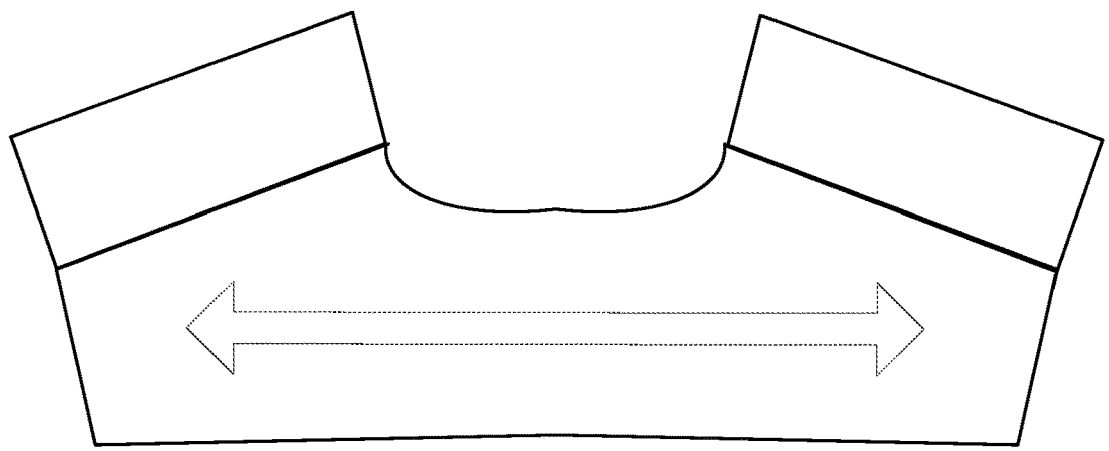
Figure 11A:
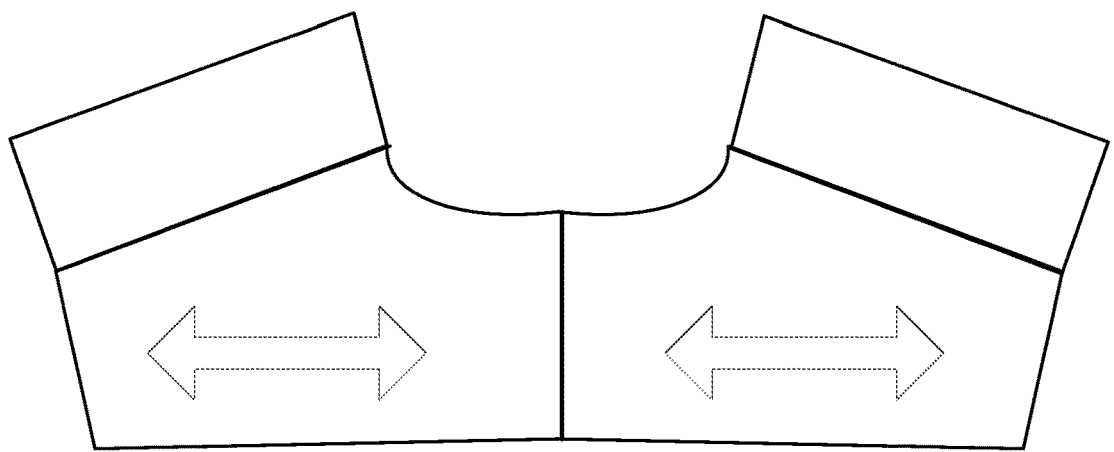
Figure 11B:
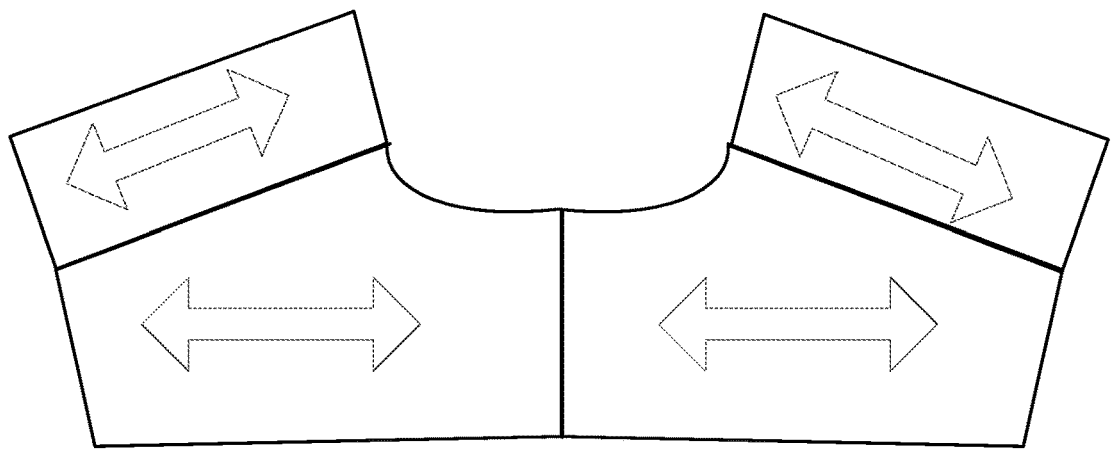
Figure 11C:
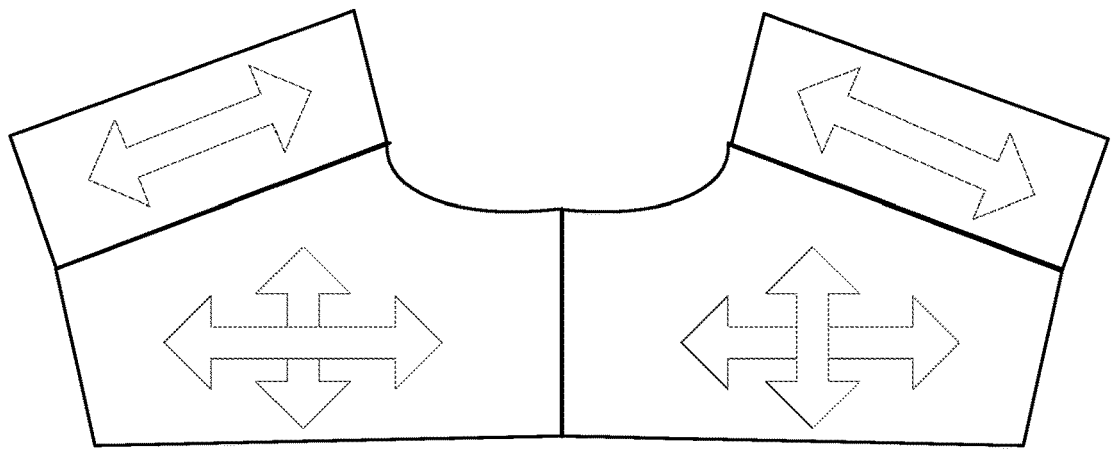

The yoke of example 3, including the front pieces, is attached to the garment with the yoke's primary (or greater) stretch and recovery directions being substantially across the back of the garment, from left armhole to right armhole (see, e.g., FIG. 10B, with primary stretch and recovery direction being, e.g., and preferably, from left to right). The front pieces each have stretch and recovery in at least one direction. The back has stretch and recovery in at least two directions (e.g., as in examples 1.2-1.9 (FIG. 8B) and examples 2.1-2.9, FIGS. 9A-9D).

Example 3.3

Same as examples 3, 3.1, or 3.2, where the fused fabric composite material is formed by fusing together a self-fabric with a fusible substrate (e.g., with a two-way or a four-way fusible substrate).

Example 3.4

Same as example 3.3, where the self-fabric is the same fabric as used for at least some other components of the garment.

Example 3.5

Same as examples 3.3 or 3.4, where the second non-composite fabric is the self-fabric.

Example 3.6

Same as examples 3 to 3.4, where the second fabric is a non-composite fabric.

Example 3.7

Same as examples 3 to 3.6, where the second fabric is a fused composite fabric having stretch and recovery properties in at least two opposing directions thereof.

Example 3.8

Same as the previous examples (3 to 3.7), where the first fused fabric comprises any general shirting fabric, including, for example, a garmenting fabric, cotton, poly-cotton, linen; a compacted woven material, a knit material, a mesh, and a compacted knit material, etc.

Example 3.9

Same as the previous examples (3 to 3.8), where the second fabric comprises any general shirting fabric, including, for example, a garmenting fabric, cotton, poly-cotton, linen; a compacted woven material, a knit material, a mesh, and a compacted knit material, etc.

Example 4

Other exemplary configurations are shown in FIGS. 10C-10F and 11A-11C, and 12A-12B.

Figure 12A:
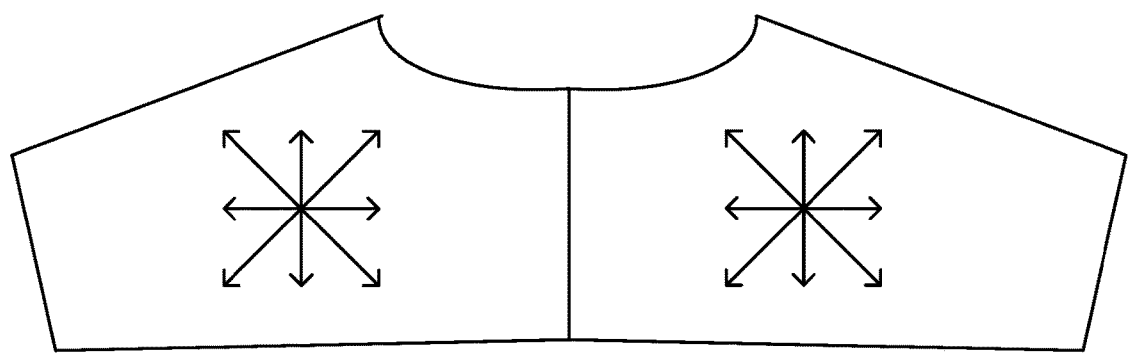
Figure 12B:
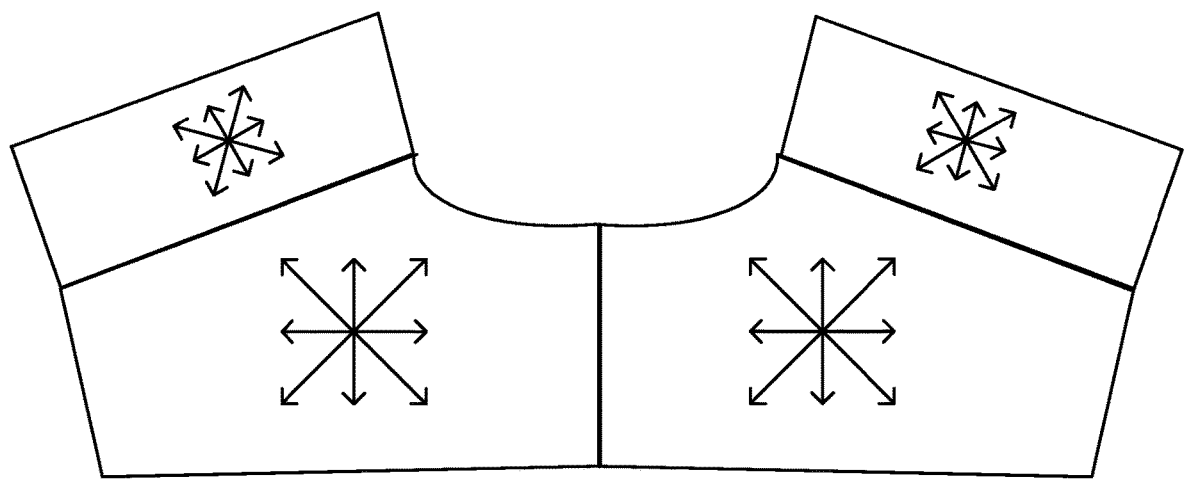

In the example of FIG. 12A, a yoke may comprise rear parts (left and right). Each of the parts may have stretch and recovery in a least one direction. In the example of FIG. 12B, a yoke may comprise front parts (left and right), and rear parts (left and right). Each of the parts may have stretch and recovery in a least one direction.

While constellations of directional arrows in the drawings show four opposing directions (left-right, up-down, and two directions in between), it should be appreciated that these arrow constellations represent any and all directions. Thus, e.g., when a piece (e.g., the left rear side of the yoke) has stretch in two directions, those directions may be vertical to each other, at 45 degrees to each other, at 45 degrees to a horizontal line, or at any other angles to each other and/or to the horizontal or vertical. The directions of symmetric pieces, e.g., the left and right front pieces or the left and right back pieces, are preferably symmetrical (see, e.g., FIGS. 10E, 11B, 11C).

When a yoke is formed from two or more layers, e.g., an inner piece and an outer piece, each layer may have stretch and recovery in the same or different directions thereof. Thus, e.g., an inner layer may provide primary stretch and recovery in a substantially left-to-right (horizontal) direction, whereas an outer layer of the yoke may provide secondary stretch and recovery at a non-zero angle to the horizontal direction (e.g., at about 30 degrees, or about 45 degrees, or about 60 degrees, or about 90 degrees to the horizontal direction).

Although any angle(s) may be chosen for the direction of stretch and recovery, those of ordinary skill in the art will appreciate and understand, upon reading this description, that the angle may be chosen depending on the intended use of a wearer of the shirt. For example, a shirt that is being used by someone doing heavy lifting may provide greater (or primary or even only) stretch and recovery in a substantially horizontal direction across the wearer's back (e.g., direction SA-SB in FIG. 8A, or directions S4, S5 in FIG. 8C). On the other hand, a shirt that is being used by someone primarily doing overhead movement may provide greater (or primary or even only) stretch and recovery in a substantially vertical direction with respect to the wearer's back (e.g., SA-SB in FIG. 8A).

A general-purpose work shirt or uniform may provide primary stretch and recovery in a substantially horizontal direction across the wearer's back (e.g., direction SA-SB in FIG. 8A), and secondary stretch and recovery at a non-zero offset angle (e.g., S2 and S3 in FIG. 8B).

It should also be appreciated that specialized shirts may be formed with different strengths and/or directions of recovery on the left and right sides.

CONCLUSION

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs."

Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

Thus is provided an expandable and flexible garment yoke and a garment with the same.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A garment comprising:
   a yoke attached to a garment body, wherein the yoke comprises a rear left section and a rear right section distinct from the rear left section, the rear left section connected to and distinct from a left sleeve of the garment and the rear right section connected to and distinct from a right sleeve of the garment,
   wherein at least a portion of the yoke is formed from a first material having stretch and recovery in at least one direction thereof, said first material being formed from a fusible substrate combined with a particular fabric having stretch properties,
   wherein the rear left section has stretch and recovery properties in a first at least two non-opposing directions thereof, and wherein the rear right section has stretch and recovery properties in a second at least two non-opposing directions thereof, and
   wherein at least one first direction of the first at least two non-opposing directions is distinct from at least one second direction of the second at least two non-opposing directions,
   wherein the garment body includes a back and a front, and the yoke includes at least one back portion configured with the back of the garment body, and at least one front portion configured with the front of the garment body,
   wherein the first material has stretch and recovery properties at offset angles with respect to the at least one direction.

2. The garment of claim 1, wherein a portion of the yoke extends below an armhole of the garment.

3. The garment of claim 1, wherein the particular fabric is single-ply.

4. The garment of claim 1, wherein the first material is formed from said particular fabric fused with said fusible substrate.

5. The garment of claim 1, wherein the yoke comprises an inner piece and an outer piece having substantially the same shape and size as the inner piece, and wherein at least one of the inner piece and the outer piece is formed from said first material.

6. The garment of claim 5, wherein both the inner piece and the outer piece are formed from said first material.

7. The garment of claim 1, wherein the particular fabric is selected from: a self-fabric, a shirting fabric, cotton, polycotton, linen, a compacted woven material, and a compacted knit material.

8. The garment of claim 1, wherein the particular fabric is the same fabric as a fabric of the garment.

9. The garment of claim 1, wherein the fusible substrate is a two-way fusible substrate.

10. The garment of claim 1, wherein at least some of the particular fabric used in the yoke is cut on a bias thereof.

11. The garment of claim 1, wherein the fusible substrate provides memory to the yoke.

12. The garment of claim 1, wherein said particular fabric has said stretch properties, at least in part, from being compacted, and wherein said fusible substrate controls said stretch properties of said particular fabric.

13. The garment of claim 1, wherein the garment is selected from: a shirt, an overall, a jacket, a hooded garment, and a dress.

14. The garment of claim 1, wherein the at least one front portion comprises a front left section extending over a left shoulder of the garment and a front right section extending over a right shoulder of the garment, and
    wherein the front left section has stretch and recovery in a third at least two directions thereof, and
    wherein the front right section has stretch and recovery in a fourth at least two directions thereof.

15. The garment of claim 14, wherein the third at least two directions include a third primary direction, and wherein the fourth at least two directions include a fourth primary direction, and wherein the third primary direction and the fourth primary direction are symmetric about the center of the garment.

16. The garment of claim 1, wherein
    said at least one first direction and said at least one second direction are symmetric about a center of the garment.

17. The garment of claim 1, wherein the yoke is a split yoke, and the rear left section and the rear right section are joined in the middle of the rear of the garment.

18. The garment of claim 1, wherein
    at least one direction of the first at least two non-opposing directions is the same as at least one direction of the second at least two non-opposing directions.

19. A garment comprising:
    a yoke attached to a garment body,
    wherein the garment body includes a back and a front, and wherein the yoke includes at least one back portion configured with the back of the garment body, and at least one front portion configured with the front of the garment body,
    wherein the yoke is connected to and distinct from (i) a left sleeve of the garment and (ii) a right sleeve of the garment,
    wherein the at least one back portion of the yoke comprises a back left yoke section and a back right yoke section distinct from said back left yoke section, said back left section yoke having substantially the same shape as said back right yoke section, said back left section yoke being connected to said back right yoke section,
    wherein at least a portion of the back left yoke section is formed from a first material, and
    wherein at least a portion of the back right yoke section is formed from said first material,
    wherein said first material is formed from a particular fabric combined with a second material, and wherein
    said back left yoke section has stretch and recovery properties in a first at least two non-opposing directions thereof, and wherein said second material comprising said back left yoke section controls said stretch and recovery properties of said back left yoke section,
    said back right yoke section has stretch and recovery in a second at least two non-opposing directions thereof, and wherein said second material comprising said back right yoke section controls said stretch and recovery properties of said back right yoke section,
    wherein said first at least two non-opposing directions are distinct from said second at least two non-opposing directions, and
    wherein the at least one front portion of the yoke comprises a front left yoke section extending over a left shoulder of the garment and a front right yoke section extending over a right shoulder of the garment, and
    wherein at least a portion of the front left yoke section and at least a portion of the front right yoke section are formed from said first material,
    wherein the front left yoke section has stretch and recovery in a third at least two directions thereof, and
    wherein the front right yoke section has stretch and recovery in a fourth at least two directions thereof.

20. The garment of claim 19, wherein
(i) the back left yoke section comprises a back left inner piece and a back left outer piece, and wherein at least one of the back left inner piece, and the back left outer piece is formed using said first material combined with the second material; and (ii) the back right yoke section comprises a back right inner piece and a back right outer piece, and wherein at least one of the back right inner piece and the back right outer piece is formed using said first material combined with the second material, and
(iii) the front left yoke section comprises a front left inner piece and a front left outer piece, and wherein at least one of the front left inner piece and the front left outer piece is formed using said first material combined with the second material; and (iv) the front right yoke section comprises a front right inner piece and a front right outer piece, and wherein at least one of the front right inner piece and the front right outer piece is formed using said first material combined with the second material.

\* \* \* \* \*